United States Patent
He et al.

(10) Patent No.: US 10,671,423 B2
(45) Date of Patent: Jun. 2, 2020

(54) HOT-PLUG HARDWARE AND SOFTWARE IMPLEMENTATION

(71) Applicant: AVAGO TECHNOLOGIES INTERNATIONAL SALES PTE. LIMITED, Singapore (SG)

(72) Inventors: Changbai He, San Jose, CA (US); Samir Bhattacharya, Pleasanton, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 160 days.

(21) Appl. No.: 15/939,158

(22) Filed: Mar. 28, 2018

(65) Prior Publication Data

US 2018/0276024 A1    Sep. 27, 2018

Related U.S. Application Data

(63) Continuation of application No. PCT/US2017/028671, filed on Apr. 20, 2017.
(Continued)

(51) Int. Cl.
*G06F 9/455* (2018.01)
*G06F 9/4401* (2018.01)
*G06F 9/445* (2018.01)

(52) U.S. Cl.
CPC ........ *G06F 9/45558* (2013.01); *G06F 9/4411* (2013.01); *G06F 9/44526* (2013.01);
(Continued)

(58) Field of Classification Search
CPC ....... G06F 9/45558; G06F 2009/45579; G06F 13/4081; G06F 2009/45595; G06F 2213/0026
See application file for complete search history.

(56) References Cited

U.S. PATENT DOCUMENTS

| 5,875,308 A | 2/1999 | Egan et al. |
| 6,338,107 B1 | 1/2002 | Neal et al. |

(Continued)

FOREIGN PATENT DOCUMENTS

| CN | 101459521 A | 6/2009 |
| CN | 202798756 U | 3/2013 |

(Continued)

OTHER PUBLICATIONS

European Search Report dated Apr. 25, 2019, issued in corresponding European Application No. 17807159.3, 8 pages.
(Continued)

*Primary Examiner* — Dong U Kim
(74) *Attorney, Agent, or Firm* — Xsensus LLP

(57) ABSTRACT

A network device may include various cards and modules, such as management modules, line cards, and switch fabric modules. In various implementations, these components can be "hot-plugged" meaning that the components can be inserted into and removed from the network device while the network device is powered on. In various implementations, hardware in the network device can identify when a component has been added. The hardware can notify a virtual machine, which can then notify the host operating system. The host operating system can added the component, and then notify the virtual machine to also add the component. Once the virtual machine has added the component, the component becomes available for use by processes executing on the virtual machine.

28 Claims, 14 Drawing Sheets

Related U.S. Application Data

(60) Provisional application No. 62/343,733, filed on May 31, 2016, provisional application No. 62/343,812, filed on May 31, 2016.

(52) U.S. Cl.
CPC .............. *G06F 9/45508* (2013.01); *G06F 2009/45579* (2013.01); *G06F 2009/45595* (2013.01)

(56) References Cited

U.S. PATENT DOCUMENTS

| | | | |
|---|---|---|---|
| 6,363,452 | B1 | 3/2002 | Lach |
| 6,460,106 | B1 | 10/2002 | Stufflebeam |
| 6,567,876 | B1 | 5/2003 | Stufflebeam |
| 6,574,695 | B1 | 6/2003 | Mott et al. |
| 6,708,283 | B1 | 3/2004 | Nelvin et al. |
| 7,877,521 | B2 | 1/2011 | Suzuki et al. |
| 7,984,219 | B2 | 7/2011 | Nguyen et al. |
| 8,402,195 | B2 | 3/2013 | Tanaka et al. |
| 8,412,875 | B2 | 4/2013 | Suzuki et al. |
| 8,443,358 | B1 | 5/2013 | Larkin et al. |
| 8,554,973 | B2 | 10/2013 | Tanaka et al. |
| 8,583,848 | B2 | 11/2013 | Miyoshi |
| 8,677,047 | B1 | 3/2014 | Chang |
| 8,683,109 | B2 | 3/2014 | Nakayama et al. |
| 8,719,483 | B2 | 5/2014 | Hidaka |
| 8,775,712 | B2 | 7/2014 | Suzuki et al. |
| 8,843,689 | B2 | 9/2014 | Engebretsen et al. |
| 8,913,620 | B2 | 12/2014 | Basso et al. |
| 8,990,468 | B2 | 3/2015 | Suzuki |
| 9,197,539 | B2 | 11/2015 | Cors et al. |
| 9,311,127 | B2 | 4/2016 | Graham et al. |
| 2008/0256283 | A1 | 10/2008 | Chiu et al. |
| 2010/0211717 | A1 | 8/2010 | Uchara et al. |
| 2011/0029693 | A1 | 2/2011 | Brinkmann et al. |
| 2013/0159572 | A1 | 6/2013 | Graham et al. |
| 2014/0181810 | A1* | 6/2014 | Lvovsky ............. G06F 9/44505 718/1 |
| 2017/0147370 | A1* | 5/2017 | Williamson ........ G06F 9/45558 |

FOREIGN PATENT DOCUMENTS

| | | |
|---|---|---|
| JP | 5110156 B2 | 12/2012 |
| WO | 2017209854 A1 | 12/2017 |

OTHER PUBLICATIONS

Hewlett Packard Enterprise "Architecture and technologies in the HPE BladeSystem c7000 Enclosure" Rev. 3, Jul. 2017, 26 pages.

Akber Kazmi "PCI Express and Non-Transparent Bridging Support High Availability" Reprinted from Embedded Computing Design / Winter 2004, 4 pages.

John Gudmundson, PLX Technology "Enabling Multi-Host System Designs with PCI Express Technology" Retrieved from Internet: http://www.rtcmagazine.com/plx-technology/, RTC Magazine, dated Aug. 6, 2015, 17 pages.

International Search Report and Written Opinion for PCT/US2017/028671, dated Jul. 21, 2017, 9 pages.

* cited by examiner

HOT-PLUG HARDWARE AND SOFTWARE IMPLEMENTATION

CROSS REFERENCE TO RELATED APPLICATIONS

This application is a continuation of International Application No. PCT/US2017/028671, filed on Apr. 20, 2017, which claims the benefit of and priority to Provisional Application No. 62/343,733, filed on May 31, 2016, and Provisional Application No. 62/343,812, filed on May 31, 2016. The entire contents of each of the aforementioned applications are incorporated herein by reference in their entirety and for all purposes.

BRIEF SUMMARY

The present disclosure relates generally to networking technologies, and more particularly to systems and methods that enable modules and cards to be hot-swapped or hot-plugged into the chassis of a network device.

A network device may include various cards and modules, such as management modules, line cards, and switch fabric modules. In various implementations, these modules and cards can be "hot-plugged" or "hot-swapped," meaning that the modules and cards can be inserted into and removed from the network device while the network device is powered on. Without hardware and/or software support for hot-plugging, the network device would need to be powered off for a module or card to be added or removed, which may result in unwanted downtime of the network device.

Provided are systems, methods, and computer-program products for a network device that supports hot-plugging. In various implementations, the network device can be configured to detect that a component is present in the network device, where the component is determined to be unknown. The component can be a physical component. The component can be detected during operation of the network device. The network device can further be configured to determine information about the component. The network device can further be configured to add the component to the host operating system. Adding the component can include providing the information about the component to the host operating system. The network device can further be configured to add the component to the virtual machine. Adding the component can include providing the information about the component to the virtual machine. When the component is added to the virtual machine, the component is accessible to one or more processes executing in the virtual machine.

In various implementations, the virtual machine can be configured to notify the host operating system to add the component. In various implementations, the host operating system can be configured to initiate adding of the component to the virtual machine. The host operating system can communicate with a hypervisor executing on the network device, and the hypervisor can add to the component to the virtual machine.

In various implementations, the network device can be configured to execute an emulated bridge module. The emulated bridge module can correspond to a virtual bridge in the virtual machine. Adding the component to the virtual machine can include connecting the component to the virtual bridge.

In various implementations, the network device can include a physical bridge. The physical bridge can connect the network device to the component. In these implementations, the emulated bridge module emulates the physical bridge. In various implementations, the emulated bridge module emulates a physical bridge associated with the component. In various implementations, the network device can be configured to execute an emulator process, where the emulated bridge module is executed by emulator process.

In various implementations, the network device can be configured to execute a hot-plug driver. The hot-plug driver can execute in the host operating system.

In various implementations, the network device can include a system module. The system module can be a physical device that is configured to detect the component. In some implementations, when the system module detects the component, the system module notifies the virtual machine. In some implementations, the virtual machine is configured to access the system module as a passthrough device.

In various implementations, detecting the component includes determining that the component was added to the network device. In various implementations, detecting the component includes scanning the network device for unknown components.

In various implementations, the network device can be configured to detect that the component has been removed from the network device. The component can be detected as removed during operation of the network device. The network device can further be configured to remove the component from the host operating system. The network device can further be configured to remove the component from the virtual machine.

In various implementations, removing the component from the virtual machine includes disconnecting the component from an emulated bridge module, wherein the emulated bridge module corresponds to a virtual bridge in the virtual machine.

In various implementations, the component is a component of a switch fabric module. A switch fabric module facilitates communication between a management module of the network device and a line card of the network device.

In various implementations, adding the component to the host operating system includes using a hot-plug function of the host operating system.

In various implementations, adding the component to the virtual machine includes using a hot-plug function in the virtual machine.

In various implementations, information about the component includes a slot identifier, where the slot identifier identifies a physical slot associated with the component.

DETAILED DESCRIPTION

Figure 1:
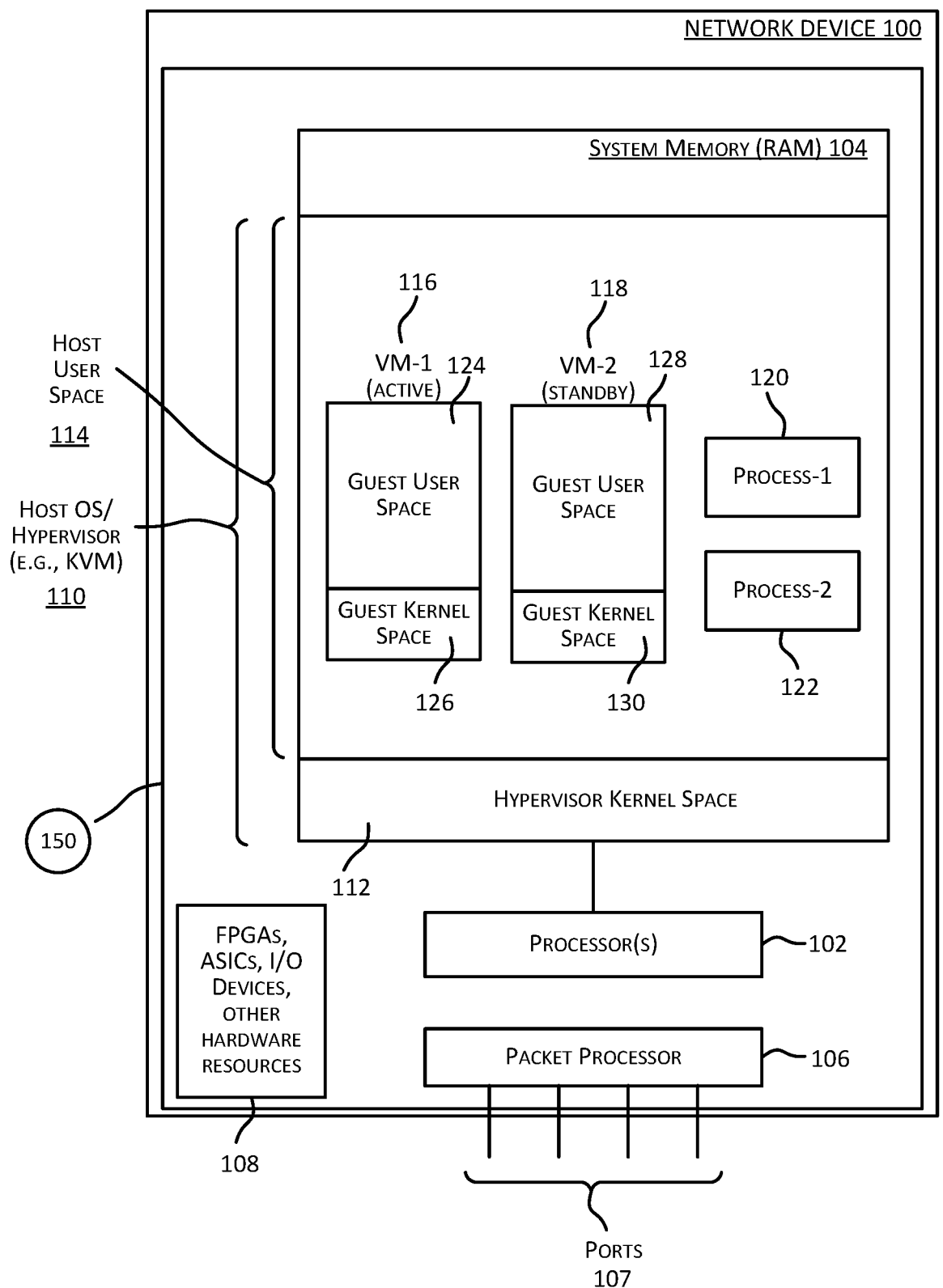
FIG. 1 is a simplified block diagram of a network device (also referred to as a "host system") that may incorporate teachings disclosed herein according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to systems and methods that enable modules and cards to be hot-swapped or hot-plugged into the chassis of a network device.

A network device can include various cards and modules, such as management modules, line cards, and switch fabric modules, among others. In various implementations, these modules and cards can be "hot-plugged" or "hot-swapped." To hot-plug or hot-swap a component means to physically insert or physically remove the component from a network device, while the network device is powered on, and possibly while the network device is in active operation. Without hardware and/or software support for hot-plugging, the network device would need to be powered off before a component can be added or removed, which may result in unwanted down time of the network device. Alternatively or additionally, when a component is hot-plugged, a human network administrator may have to reconfigure the network device to recognize the new component or so that the network device knows the component has been removed.

Various hot-plug mechanisms exist. For example, the Peripheral Component Interconnect Express (PCIe) specification provides for hot-plug of PCIe-compatible components into a PCIe bus. While the hardware for using PCIe-based hot-plugging can be straightforward, the software support can be complicated. To overcome these complexities, and to also enable hot-plug of other types of devices (e.g., Universal Serial Bus (USB), Firewire, and other types of devices), some operating systems include built-in support for hot-plugging. For example, various versions of the Windows® and Linux operating systems can automatically add hot-plugged devices to the operating system.

In some implementations, a network device can include a virtual machine, where the virtual machine runs a network operating system. The network operating system can manage the functionality of the network device, including transmission, receipt, and/or routing of packets. Using a virtual machine to run the network operating system can make the network device more flexible and robust. For example, should the virtual machine crash, another virtual machine can be quickly brought up, and operation of the network device can resume with possibly only a small amount of downtime. If the network operating system were natively running as the host operating system of the network device, and the network operating system crashes, the network device would have to be rebooted, resulting in longer downtime and interruption of packet flows.

A network operating system can be Linux or Windows® based, or be based on some other operating system, and can thus support hot-plugging. When the network operating system runs in a virtual machine, however, hot-plug capability may be limited. For example, when a virtual machine is booted, typically the virtual machine is configured with all the virtual hardware that is available within the virtual machine, including any devices that can be added or removed using a hot-plug mechanism. In this example, all hot-pluggable components need to be specified in advance, and the network device would not be able to hot-plug a component that is unknown when the virtual machine is launched.

Another difficulty of having the network operating system in a virtual machine is that a hot-plugged component needs to be added to both the native host operating system and to the virtual machine. That is, a component cannot be hot-plugged to a virtual machine until the component is known to the host operating system that manages the underlying hardware. On the one hand, while the host operating system can support hot-plug, no mechanism exists for communicating this information to the virtual machine. On the other hand, assuming that the virtual machine's operating system can be made to hot-plug a component, no mechanism exists for the virtual machine to then inform the host operating system to also hot-plug the component. In these and other situations, a human operator would have to manually configure the host operating system or the virtual machine, or both.

In various implementations, a network device can include hardware and software that enables hot-plug of components. In these implementations, the network device can automatically configure the virtual machine and/or host operating system when a component is added or removed. An operator of the network device need do nothing more than to insert or remove the component from the network device's chassis. Additionally, the component need not be known to the network device in advance.

In various implementations, the network device's hardware can include an integrated circuit device, or a combination of integrated circuit devices, that can detect when a component has been hot-plugged. This device, referred to herein as a system module, can be provided to the virtual machine using a passthrough mechanism. Thus, when a hot-plug occurs and the system module generates an interrupt, the interrupt can be received in the virtual machine. Connectivity between the network device and a hot-plugged component can further be accomplished using integrated circuit devices for linking busses, which are generally referred to as bridges.

In various implementations, the network device's software can include several different components that assist in supporting hot-plug. These software components can include a device driver for the system module that can instruct the virtual machine to add or remove a hot-plugged component. The network device can also be configured with an emulated bridge, which can correspond to the physical bridge in the network device and can also be available to the virtual machine. Using the emulated bridge, the virtual machine can hot-plug a physical component. To assist, the network device can also include a hot-plug driver. The hot-plug driver can manage hot-plugging of a component into the host operating system, so that the component is understood to be a part of the network device's hardware. The hot-plug driver can further provide any needed information about the component to the virtual machine, so that hot-plugging of the component can be accomplished in the virtual machine.

In various implementations, a network device can include other mechanisms that assist in robust operation of the network device. For example, the network device can include duplicate management modules, one that is active and in control of the network device, and one that is on standby and ready to take over operation of the network device. Components that are hot-plugged into such a network device can make use of non-transparent bridging mechanisms to avoid conflicts that would otherwise occur due to having more than one module that can be in control of the network device.

FIG. 1 is a simplified block diagram of a network device 100 (also referred to as a "host system") that may incorporate teachings disclosed herein according to certain embodiments. Network device 100 may be any device that is capable of receiving and forwarding packets, which may be data packets or signaling or protocol-related packets (e.g., keep-alive packets). For example, network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif.

As depicted in FIG. 1, the example network device 100 comprises multiple components including one or more processors 102, a system memory 104, a packet processor 106 (which may also be referred to as a traffic manager), and optionally other hardware resources or devices 108. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components. Network device 100 depicted in FIG. 1 may also include (not shown) one or more communication channels (e.g., an interconnect or a bus) for enabling multiple components of network device 100 to communicate with each other.

Network device 100 may include one or more processors 102. Processors 102 may include single or multicore processors. System memory 104 may provide memory resources for processors 102. System memory 104 is typically a form of random access memory (RAM) (e.g., dynamic random access memory (DRAM), Synchronous DRAM (SDRAM), Double Data Rate SDRAM (DDR SDRAM)). Information related to an operating system and programs or processes executed by processors 102 may be stored in system memory 104. Processors 102 may include general purpose microprocessors such as ones provided by Intel®, AMD®, ARM®, Freescale Semiconductor, Inc., and the like, that operate under the control of software stored in associated memory.

As shown in the example depicted in FIG. 1, a host operating system 110 may be loaded in system memory 104 and executed by one or more processors 102. Host operating system 110 may be loaded, for example, when network device 100 is powered on. In certain implementations, host operating system 110 may also function as a hypervisor and facilitate management of virtual machines and other programs that are executed by network device 100. Managing virtual machines may include partitioning resources of network device 100, including processor and memory resources, between the various programs. A hypervisor is a program that enables the creation and management of virtual machine environments including the partitioning and management of processor, memory, and other hardware resources of network device 100 between the virtual machine environments. A hypervisor enables multiple guest operating systems (GOSs) to run concurrently on network device 100.

As an example, in certain embodiments, host operating system 110 may include a version of a KVM (Kernel-based Virtual Machine), which is an open source virtualization infrastructure that supports various operating systems including Linux, Windows®, and others. Other examples of hypervisors include solutions provided by VMWare®, Xen®, and others. Linux KVM is a virtual memory system, meaning that addresses seen by programs loaded and executed in system memory are virtual memory addresses that have to be mapped or translated to physical memory addresses of the physical memory. This layer of indirection enables a program running on network device 100 to have an allocated virtual memory space that is larger than the system's physical memory.

In the example depicted in FIG. 1, the memory space allocated to operating system 110 (operating as a hypervisor) is divided into a kernel space 112 and a user space 114 (also referred to as host user space). Multiple virtual machines and host processes may be loaded into user space 114 and executed by processors 102. The memory allocated to a virtual machine (also sometimes referred to as a guest operating or GOS) may in turn include a kernel space portion and a user space portion. A virtual machine may have its own operating system loaded into the kernel space of the virtual machine. A virtual machine may operate independently of other virtual machines executed by network device 100 and may be unaware of the presence of the other virtual machines.

A virtual machine's operating system may be the same as or different from the host operating system 110. When multiple virtual machines are being executed, the operating system for one virtual machine may be the same as or different from the operating system for another virtual machine. In this manner, operating system 110, for example through a hypervisor, enables multiple guest operating systems to share the hardware resources (e.g., processor and memory resources) of network device 100.

For example, in the embodiment depicted in FIG. 1, two virtual machines VM-1 116 and VM-2 118 have been loaded into user space 114 and are being executed by processors 102. VM-1 116 has a guest kernel space 126 and a guest user space 124. VM-2 118 has its own guest kernel space 130 and guest user space 128. Typically, each virtual machine has its own secure and private memory area that is accessible only to that virtual machine. In certain implementations, the creation and management of virtual machines 116 and 118 may be managed by hypervisor running on top of or in conjunction with the operating system 110. The virtualization infrastructure can be provided, for example, by KVM. While only two virtual machines are shown in FIG. 1, this is not intended to be limiting. In alternative embodiments, any number of virtual machines may be loaded and executed.

Various other host programs or processes may also be loaded into user space 114 and be executed by processors 102. For example, as shown in the embodiment depicted in FIG. 1, two host processes 120 and 122 have been loaded into user space 114 and are being executed by processors 102. While only two host processes are shown in FIG. 1, this is not intended to be limiting. In alternative embodiments, any number of host processes may be loaded and executed.

In certain embodiments, a virtual machine may run a network operating system (NOS) (also sometimes referred to as a network protocol stack) and be configured to perform processing related to forwarding of packets from network device 100. As part of this processing, the virtual machine may be configured to maintain and manage routing information that is used to determine how a data packet received by network device 100 is forwarded from network device 100. In certain implementations, the routing information may be stored in a routing database (not shown) stored by network device 100. The virtual machine may then use the routing information to program a packet processor 106, which then performs packet forwarding using the programmed information, as described below.

The virtual machine running the NOS may also be configured to perform processing related to managing sessions for various networking protocols being executed by network device 100. These sessions may then be used to send signaling packets (e.g., keep-alive packets) from network device 100. Sending keep-alive packets enables session availability information to be exchanged between two ends of a forwarding or routing protocol.

In certain implementations, redundant virtual machines running network operating systems may be provided to ensure high availability of the network device. In such implementations, one of the virtual machines may be configured to operate in an "active" mode (this virtual machine is referred to as the active virtual machine) and perform a set of functions while the other virtual machine is configured to operate in a "standby" mode (this virtual machine is referred to as the standby virtual machine) in which the set of functions performed by the active virtual machine are not performed. The standby virtual machine remains ready to take over the functions performed by the active virtual machine. Conceptually, the virtual machine operating in active mode is configured to perform a set of functions that are not performed by the virtual machine operating in standby mode. For example, the virtual machine operating in active mode may be configured to perform certain functions related to routing and forwarding of packets from network device 100, which are not performed by the virtual machine operating in standby mode. The active virtual machine also takes ownership of and manages the hardware resources of network device 100.

Certain events may cause the active virtual machine to stop operating in active mode and for the standby virtual machine to start operating in the active mode (i.e., become the active virtual machine) and take over performance of the set of functions related to network device 100 that are performed in active mode. The process of a standby virtual machine becoming the active virtual machine is referred to as a failover or switchover. As a result of the failover, the virtual machine that was previously operating in active mode prior to the failover may operate in the standby mode after the failover. A failover enables the set of functions performed in active mode to be continued to be performed without interruption. Redundant virtual machines used in this manner may reduce or even eliminates the downtime of network device's functionality, which may translate to higher availability of network device 100. The set of functions that is performed in active mode, and which is not performed in by the active virtual machine and not performed by the standby virtual machine may differ from one network device to another.

Various different events may cause a failover to occur. Failovers may be voluntary or involuntary. A voluntary failover may be purposely caused by an administrator of the network device or network. For example, a network administrator may, for example, using a command line instruction, purposely cause a failover to occur. There are various situations when this may be performed. As one example, a voluntary failover may be performed when software for the active virtual machine is to be brought offline so that it can be upgraded. As another example, a network administrator may cause a failover to occur upon noticing performance degradation on the active virtual machine or upon noticing that software executed by the active computing domain is malfunctioning.

An involuntary failover typically occurs due to some critical failure in the active virtual machine. This may occur, for example, when some condition causes the active virtual machine to be rebooted or reset. This may happen, for example, due to a problem in the virtual machine kernel, critical failure of software executed by the active virtual machine, and the like. An involuntary failover causes the standby virtual machine to automatically become the active virtual machine.

In the example depicted in FIG. 1, VM-1 116 is shown as operating in active mode and VM-2 118 is shown as operating in standby mode. The active-standby model enhances the availability of network device 100 by enabling the network device to support various high-availability functionality such as graceful restart, non-stop routing (NSR), and the like.

During normal operation of network device 100, there may be some messaging that takes place between the active virtual machine and the standby virtual machine. For example, the active virtual machine may use messaging to pass network state information to the standby virtual machine. The network state information may comprise information that enables the standby virtual machine to become the active virtual machine upon a failover or switchover in a non-disruptive manner. Various different schemes may be used for the messaging, including but not restricted to Ethernet-based messaging, Peripheral Component Interconnect (PCI)-based messaging, shared memory based messaging, and the like.

Hardware resources 108 or devices may include without restriction one or more field programmable gate arrays (FPGAs), application specific integrated circuits (ASICs), I/O devices, and the like. I/O devices may include devices such as Ethernet devices, PCI Express (PCIe) devices, and others. In certain implementations, some of hardware resources 108 may be partitioned between multiple virtual machines executed by network device 100 or, in some instances, may be shared by the virtual machines. One or more of hardware resources 108 may assist the active virtual machine in performing networking functions. For example, in certain implementations, one or more FPGAs may assist the active virtual machine in performing the set of functions performed in active mode.

As previously indicated, network device 100 may be configured to receive and forward packets to facilitate delivery of the packets to their intended destinations. The packets may include data packets and signal or protocol packets (e.g., keep-alive packets). The packets may be received and/or forwarded using one or more ports 107. Ports 107 represent the I/O plane for network device 100. A port within ports 107 may be classified as an input port or an output port depending upon whether network device 100 receives or transmits a packet using that port. A port over which a packet is received by network device 100 may be referred to as an input port. A port used for communicating or forwarding a packet from network device 100 may be referred to as an output port. A particular port may function both as an input port and an output port. A port may be connected by a link or interface to a neighboring network device or network. In some implementations, multiple ports of network device 100 may be logically grouped into one or more trunks.

Ports 107 may be capable of receiving and/or transmitting different types of network traffic at different speeds, such as speeds of 1 Gigabits per second (Gbps), 10 Gbps, 100 Gbps, or more. Various different configurations of ports 107 may be provided in different implementations of network device 100. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

In certain implementations, upon receiving a data packet via an input port, network device 100 is configured to determine an output port to be used for transmitting the data packet from network device 100 to facilitate communication of the packet to its intended destination. Within network device 100, the packet is forwarded from the input port to the determined output port and then transmitted or forwarded from network device 100 using the output port.

Various different components of network device 100 are configured to cooperatively perform processing for determining how a packet is to be forwarded from network device 100. In certain embodiments, packet processor 106 may be configured to perform processing to determine how a packet is to be forwarded from network device 100. In certain embodiments, packet processor 106 may be configured to perform packet classification, modification, forwarding and Quality of Service (QoS) functions. As previously indicated, packet processor 106 may be programmed to perform forwarding of data packets based upon routing information maintained by the active virtual machine. In certain embodiments, upon a receiving a packet, packet processor 106 is configured to determine, based upon information extracted from the received packet (e.g., information extracted from a header of the received packet), an output port of network device 100 to be used for forwarding the packet from network device 100 such that delivery of the packet to its intended destination is facilitated. Packet processor 106 may then cause the packet to be forwarded within network device 100 from the input port to the determined output port. The packet may then be forwarded from network device 100 to the packet's next hop using the output port.

In certain instances, packet processor 106 may be unable to determine how to forward a received packet. Packet processor 106 may then forward the packet to the active virtual machine, which may then determine how the packet is to be forwarded. The active virtual machine may then program packet processor 106 for forwarding that packet. The packet may then be forwarded by packet processor 106.

In certain implementations, packet processing chips or merchant ASICs provided by various third-party vendors may be used for packet processor 106 depicted in FIG. 1. For example, in some embodiments, Ethernet switching chips provided by Broadcom® or other vendors may be used. For example, in some embodiments, Qumran ASICs may, for example, be used in a pizza-box implementation, or Jericho packet processor chips (BCM88670) may, for example, be used in a chassis-based system, or other ASICs provided by Broadcom® may be used as packet processor 106. In alternative implementations, chips from other vendors may be used as packet processor 106.

Figure 2:
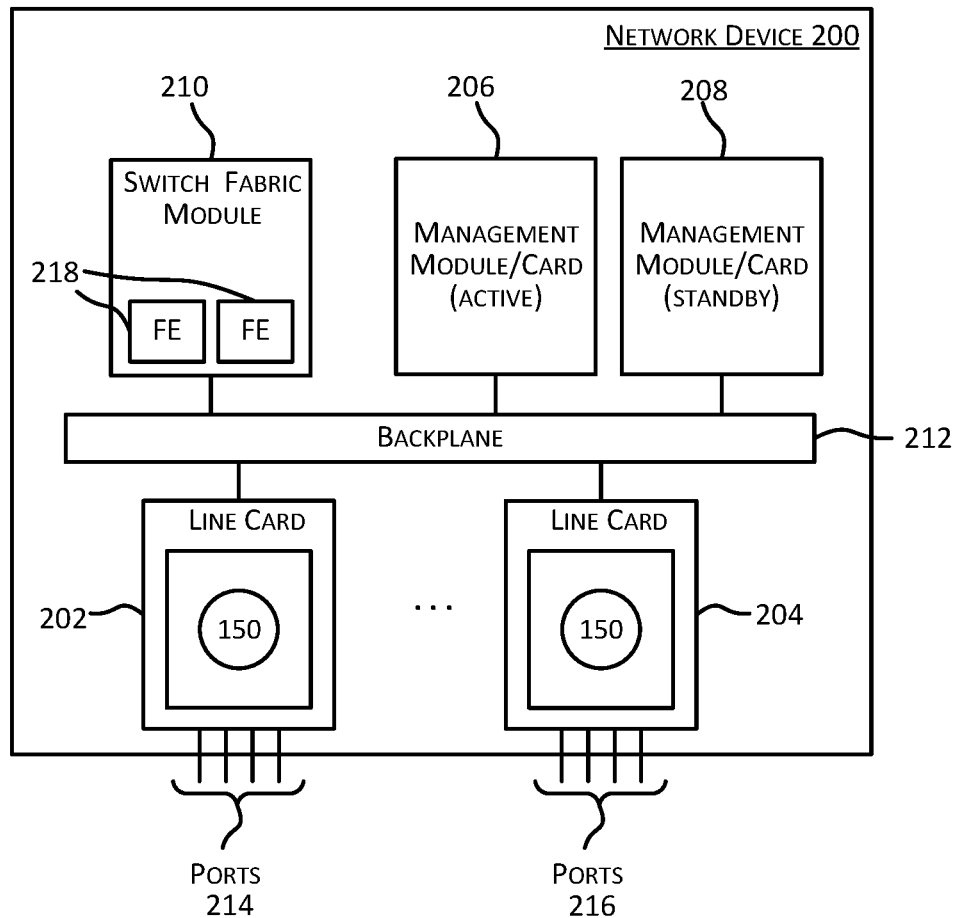
FIG. 2 is a simplified block diagram of yet another example network device.

FIG. 2 is a simplified block diagram of another example network device 200. Network device 200 depicted in FIG. 2 is commonly referred to as a chassis-based system (network device 100 depicted in FIG. 1 is sometimes referred to as a "pizza-box" system). Network device 200 may be configured to receive and forward packets, which may be data packets or signaling or protocol-related packets (e.g., keep-alive packets). Network device 200 comprises a chassis that includes multiple slots, where a card or blade or module can be inserted into each slot. This modular design allows for flexible configurations, with different combinations of cards in the various slots of the network device for supporting differing network topologies, switching needs, and performance requirements.

In the example depicted in FIG. 2, network device 200 comprises multiple line cards (including first line card 202 and a second line card 204), two management cards/modules 206, 208, and one or more switch fabric modules (SFMs) 210. A backplane 212 is provided that enables the various cards/modules to communicate with each other. In certain embodiments, the cards may be hot swappable, meaning they can be inserted and/or removed while network device 200 is powered on. In certain implementations, network device 200 may be a router or a switch such as various routers and switches provided by Brocade Communications Systems, Inc. of San Jose, Calif.

Network device 200 depicted in FIG. 2 is merely an example and is not intended to unduly limit the scope of inventive embodiments recited in the claims. One of ordinary skill in the art would recognize many variations, alternatives, and modifications. For example, in some embodiments, network device 200 may have more or fewer components than shown in FIG. 2, may combine two or more components, or may have a different configuration or arrangement of components.

In the example depicted in FIG. 2, network device 200 comprises two redundant management modules 206, 208. The redundancy enables the management modules to operate according to the active-standby model, where one of the management modules is configured to operate in standby mode (referred to as the standby management module) while the other operates in active mode (referred to as the active management module). The active management module may be configured to perform management and control functions for network device 200 and may represent the management plane for network device 200. The active management module may be configured to execute applications for performing management functions such as maintaining routing tables, programming the line cards (e.g., downloading information to a line card that enables the line card to perform data forwarding functions), and the like. In certain embodiments, both the management modules and the line cards act as a control plane that programs and makes programming decisions for packet processors in a network device. In a chassis-based system, a management module may be configured as a coordinator of multiple control planes on the line cards.

When a failover or switchover occurs, the standby management module may become the active management module and take over performance of the set of functions performed by a management module in active mode. The management module that was previously operating in active mode may then become the standby management module. The active-standby model in the management plane enhances the availability of network device 200, allowing the network device to support various high-availability functionality such as graceful restart, non-stop routing (NSR), and the like.

In the example depicted in FIG. 2, management module 206 is shown as operating in active mode and management module 208 is shown as operating in standby mode. Management modules 206 and 208 are communicatively coupled to the line cards and switch fabric modules (SFMs) 210 via backplane 212. Each management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory.

A switch fabric module (SFM) 210 may be configured to facilitate communications between the management modules 206, 208 and the line cards of network device 200. There can be one or more SFMs in network device 200. Each SFM 210 may include one or more fabric elements (FEs) 218. The fabric elements provide an SFM the ability to forward data from an input to the SFM to an output of the SFM. An SFM may facilitate and enable communications between any two modules/cards connected to backplane 212. For example, if data is to be communicated from one line card 202 to another line card 204 of network device 200, the data may be sent from the first line card to SFM 210, which then causes the data to be communicated to the second line card using backplane 212. Likewise, communications between management modules 206, 208 and the line cards of network device 200 are facilitated using SFMs 210.

In the example depicted in FIG. 2, network device 200 comprises multiple line cards including line cards 202 and 204. Each line card may comprise a set of ports 214, 216 that may be used for receiving and forwarding packets. The ports 214, 216 of a line card may be capable of receiving and/or transmitting different types of network traffic at different speeds, such as speeds of 1 Gbps, 10 Gbps, 100 Gbps, or more. Various different configurations of line card ports may be provided in network device 200. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

Each line card may include one or more single or multicore processors, a system memory, a packet processor, and one or more hardware resources. In certain implementations, the components on a line card may be configured similar to the components of network device 100 depicted in FIG. 1 (components collectively represented by reference 150 from FIG. 1 and also shown in line cards 202, 204 in FIG. 2).

A packet may be received by network device 200 via a port on a particular line card. The port receiving the packet may be referred to as the input port and the line card as the source/input line card. The packet processor on the input line card may then determine, based upon information extracted from the received packet, an output port to be used for forwarding the received packet from network device 200. The output port may be on the same input line card or on a different line card. If the output port is on the same line card, the packet is forwarded by the packet processor on the input line card from the input port to the output port and then forwarded from network device 200 using the output port. If the output port is on a different line card, then the packet is forwarded from the input line card to the line card containing the output port using backplane 212. The packet is then forwarded from network device 200 by the packet processor on the output line card using the output port.

In certain instances, the packet processor on the input line card may be unable to determine how to forward a received packet. The packet processor may then forward the packet to the active virtual machine on the line card, which then determines how the packet is to be forwarded. The active virtual machine may then program the packet processor on the line card for forwarding that packet. The packet may then be forwarded to the output port (which may be on the input line card or some other line card) by that packet processor and then forwarded from network device 200 using via the output port.

In certain instances, the active virtual machine on an input line card may be unable to determine how to forward a received packet. The packet may then be forwarded to the active management module, which then determines how the packet is to be forwarded. The active management module may then communicate the forwarding information to the line cards, which may then program their respective packet processors based upon the information. The packet may then be forwarded to the line card containing the output port (which may be on the input line card or some other line card) and then forwarded from network device 200 using via the output port.

In various implementations, a network device implemented as described in FIG. 1 and/or FIG. 2 may be a chassis-based system. In these implementations, the management modules, line cards, and switch fabric modules can each be "hot-plugged" or "hot-swapped," meaning that these components can be inserted into or removed from the network device while the network device is in operation. The term "hot-plug" can refer to both the physical insertion or removal of a component into a chassis, as well as connecting the devices on the component to a virtual machine (e.g., "virtual" hot-plug in the virtual environment of the virtual machine). In the latter case, the component may be present and powered on in the chassis before the virtual machine is booted, and may be, as discussed further below, undiscoverable to the virtual machine until the virtual machine is on line and able to take steps to make the component visible.

Figure 3:
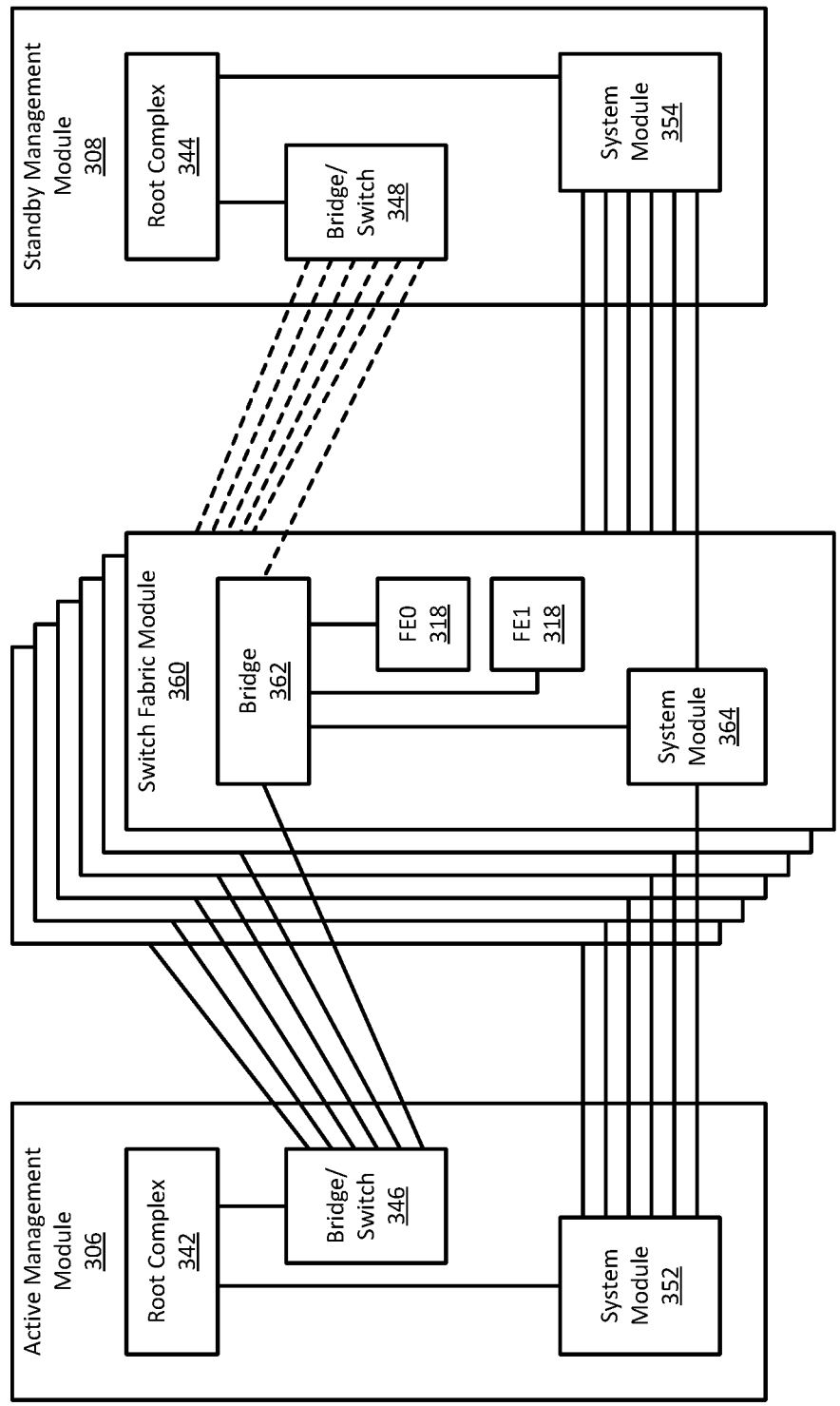
FIG. 3 illustrates an example of components of a network device that can be hot-plugged into or out of the network device.

FIG. 3 illustrates an example of components of a network device that can be hot-plugged into or out of the network device. FIG. 3 also illustrates an example of the connectivity between the components. These components include an active management module 306, a standby management module 308, and one or more switch fabric modules 360. In various implementations, the management modules 306, 308 and the switch fabric modules 360 communicate over a backplane in the network device. The backplane can include slots into which the management modules 306, 308 and/or the switch fabric modules 360 can be connected. For example, the backplane can include slots for the switch fabric modules 360.

The active 306 and standby 308 management modules, as discussed above, can perform management and control functions for a network device, including receipt, transmission, and/or routing of packets. As discussed above, the active management module 306 is presently in control of the network device and the standby management module 308 is ready to take over operation of the network device should the active management module 306 go offline.

In the illustrated example, each of the management modules 306, 308 includes a root complex 342, 344, a combined bridge/switch 346, 348, and a system module 352, 354. The root complexes 342, 344 provide an interface between one or more processors on each management module 306, 308 and a bus complex on the management modules 306, 308. Through the root complexes 342, 344, the management module's 306, 308 processors can interface with and control the various devices connected to the bus complex. In some implementations, the root complex 342, 344 is integrated into a processor.

The combined bridges/switches 346, 348 can include both bridging and switching functionality. A bridge is a device that can connect two bus complexes together, where the two busses are not necessarily the same. A switch is a device that can function as a node in a bus complex, connecting multiple devices within the bus complex. Bridges and switches can be implemented as integrated circuit devices, and/or can be components of an integrated circuit device.

Switch functionality enables the bridges/switches 346, 348 on the management modules 306, 308 to connect multiple components to the management modules 306, 308. For example, the bridges/switches 346, 348 can have multiple downstream ports, where "downstream" is away from the root complex 342, 344. For example, the bridges/switches 346, 348 can include two, six, eight, or some other number of downstream ports. Each of these downstream ports can be connected to, in the illustrated example, a corresponding bridge 362 on a switch fabric module 360.

Bridge functionality enables the bridges/switches 346, 348 to connect a bus complex on a switch fabric module 360 to the bus complex on a management module 306, 308. For example, once the bridges/switches 346, 348 are connected to the bridge 362 on a switch fabric module 360, components such as the system module 364 and fabric elements 318 on the switch fabric module 360 can be accessed by the root complex 342, 344 in the same way that components on the management modules 306, 308 can be accessed. In various implementations, the bridge 362 on the switch fabric module 360 can be configured so that the bus complex on the switch fabric module 360 is only visible to one root complex 342, 344. For example, in the illustrated example, the bus complex on the switch fabric module 360 is visible to the active management module 306 and is hidden from the standby management module 308. In some implementations, the bridge 362 on the switch fabric module 360 can also be a combined bridge and switch.

The switch fabric module 360 is one example of a component that can be connected to the management modules 306, 308. In various implementations, other components in the network device can be connected to the management modules 306, 308. In some implementations, the network device can have multiple switch fabric modules, each of which can be hot-swapped. In various implementations, a switch fabric module 360 can include a bridge 362 that connects to the bridges/switches 346, 348 on the management modules 306, 308, a system module 364 that assists in device discovery in a hot-plug situation, and one or more fabric elements 318. As discussed above, the fabric elements 318 can be used by the network device to receive and forward data between various modules and/or cards connected to the network device. In various implementations, this data is exchanged between the fabric elements 318 and these other modules or cards over a backplane in the network device.

In various implementations, among other responsibilities, the system module 364 on the switch fabric module 360 assists in device discovery when the switch fabric module 360 is hot-plugged. In some implementations, the network device's backplane can include a bus dedicated to communications between the system modules 364 on the switch fabric modules 360 and the system modules 352, 354 on the management module 306, 308. Thus, for example, when the switch fabric module 360 is hot-plugged into—meaning added—to a network device, the system module 364 on the switch fabric module 360 can connect through pins, wires, and/or traces to the system modules 352, 354 on the management modules 306, 308. In this example, presence of the system module 364 on the switch fabric module 360 on the dedicated bus informs the system modules 352, 354 on the management modules 306, 308 that a new component is present in the network devices. For example, the system module 352 on the active management module 306 can use a control signal on the dedicated bus that can be used to power on the newly added switch fabric module 360. In this example, the system module 352 on the active management module 306 can read registers in the system module 364, on the switch fabric module 360, to determine information about the switch fabric module 360. For example, the system module 364 on the switch fabric module can include a "slot present" status in a register, as well as information that identifies and/or describes the switch fabric module 360. In this and other examples, the system module 352 on the active management module 306 can initiate a procedure that causes the switch fabric module's components to be added to the known hardware of the network device, and for the software of the active management module 306 to be able to make use of the switch fabric module 360. This procedure is discussed further below.

The system module 354 on the standby management module 308 can also detect the presence of the system module 364 on the switch fabric module 360, though on the standby management module 308, the switch fabric module 360 may not be added to known hardware of the network device and/or to the software's understanding of the hardware. Alternatively or additionally, connections between the bridge/switch 348 and the bridge 362 on the switch fabric module can be established but made inactive. Should a failover to the standby management module 308 occur, the standby management module 308 can then add any already present switch fabric modules 360 to a listing of the hardware of the network device, as well as to the hardware that is accessible to software executing on the management module 308.

When a switch fabric module 360 is hot-plugged out of—meaning removed from—a network device, the system modules 352, 354 can also assist in detection of the removal. For example, the system module 352 on the active management module 306 can detect that the system module 364 on the switch fabric module 360 is no longer present on the dedicated bus. For example, the absence of power being drawn by the switch fabric module 360 can indicate to the system module 352 on the active management module 306 that the switch fabric module 360 is no longer present in the system. The system module 352 on the active management module 306 can then initiate a process that removes the switch fabric module 360 from the known hardware of the network device.

In various implementations, the system modules 352, 354 on the management modules 306, 308 can have other responsibilities. For example, the system modules 352, 354 can be responsible for negotiating which of the management modules 306, 308 will be active and which will be on standby.

To enable both the active 306 and the standby 308 management modules to be simultaneously connected to one switch fabric module 360, the bridge 362 on the switch fabric module 360 can be configured to support non-transparent bridging. Typically, a bridge is "transparent," meaning any devices on the downstream side of the bridge can be seen by the root complex on the upstream side as if the bridge were not present. When a bridge includes a non-transparent bridging function, the bridge itself may appear as an endpoint device, and any devices on the downstream side cannot be seen from the upstream side. Non-transparent bridging can provide hardware protection and isolation, and can ensure that only one root complex is able to access the devices on the downstream side of the bridge.

Figure 4:
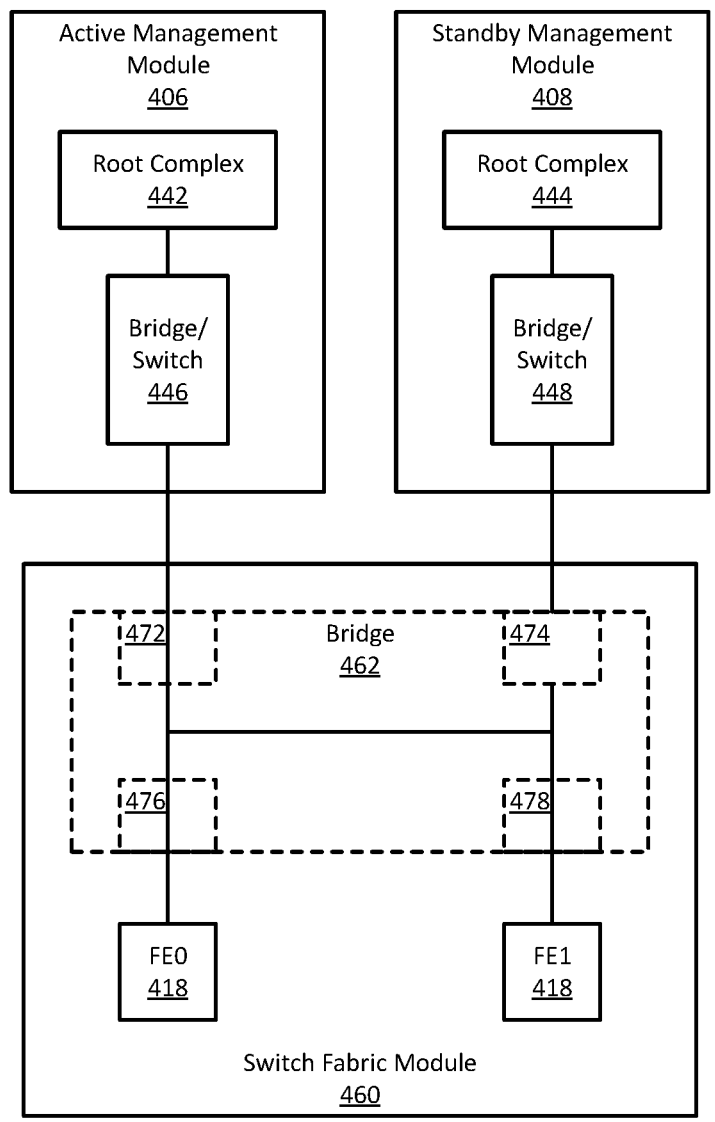
FIG. 4 illustrates an example of a switch fabric module that includes a bridge whose ports can be configured to be non-transparent.

FIG. 4 illustrates an example of a switch fabric module 460 that includes a bridge 462 whose ports can be configured to be non-transparent. In the illustrated example, the switch fabric module 460 is connected to an active management module 406 and a standby management module 408. In various implementations, connectivity and communications between the switch fabric module 460 and the management modules 406, 408 can be provided by a backplane in a network device.

The management modules 406, 408 in the illustrated example each include a root complex 442, 444, through which processor(s) on the management modules 406, 408 can communicate with various devices on the management modules 406, 408, including a combined bridge/switch 446, 448. The bridges/switches 446, 448 can further be connected to the bridge 462 on the switch fabric module 460.

In this example, the bridge 462 on the switch fabric module 460 includes four ports, two upstream ports 472, 474 and two downstream ports 476, 478. The first upstream port 472 is connected to the bridge/switch 446 on the active management module 406 and the second upstream port 474 is connected to the bridge/switch 448 on the standby management module 408. The two downstream ports 476, 478 are each connected to different fabric elements 418. Internally, the bridge 462 can allow communications between any of the upstream ports 472, 474 and the downstream ports 476, 478. In various implementations, the bridge 462 can include more or fewer upstream and/or downstream ports.

The fabric elements 418 of this example can be referred to as "endpoints" in that they are termini or leaf nodes in the hierarchy of devices in the system. Endpoints are typically the final destination of a transaction on a bus. Switches and bridges, in contrast, pass transactions through themselves, and thus are, except in particular circumstances, not considered endpoints.

In various implementations, only the root complex 442 on the active management module 406 can access the fabric elements 418. In some cases, conflicts can occur should both the root complex 442 of the active management module 406 and the root complex 444 of the standby management module 408 be able to simultaneously access the fabric elements 460. For example, each root complex 442, 444 may attempt to assign different address ranges to the fabric elements 418. In this example, the fabric elements 418 can each have only one address range, in which case only one root complex 442, 444 can access the fabric elements 418 while transactions from the other root complex 442, 444 would be lost. As another example, when the system power is on, which management module 406, 408 is active and which is on standby may not be known until both management modules 406, 408 have booted and have negotiated their roles. In this example, during booting, each of the management modules 406, 408 may attempt to configure the fabric elements 418, potentially resulting in conflicting configurations.

To avoid these and other possible conflicts, the upstream ports 472, 474 of the bridge 462 can be configured to be "non-transparent" upon power on. Being non-transparent means that each of the upstream ports 472, 474 blocks the management modules' 406, 408 view of downstream devices. Stated differently, non-transparent ports act as endpoint devices, such that, should a root complex 442, 444 request information about any devices downstream from the bridge 462, the bridge 462 will respond that there are no downstream devices.

Once the active and standby roles are established, in various implementations, the active management module 406 can reconfigure the bridge 462, and make the first upstream port 472 transparent. The second upstream port 474, to which the standby management module 408 is connected, is left non-transparent. Once the upstream port 472 is made transparent, downstream fabric elements 418 become visible to the root complex 442 on the active management module 406. Once discovered, the active management module 406 can maintain a placeholder for each fabric element 418. For example, the active management module's host operating system can add in its kernel a device node (a file identifies a device and connects to a driver for the device) for each device. The root complex 442 can then configure and make use of the fabric elements 418.

When a failover occurs, and the standby management module 408 assumes the active role, the formerly standby management module 408 can reconfigure the bridge 462 on the switch fabric module 460. The formerly standby management module 408 can make the upstream port 474 to which it is connected transparent, and make the other upstream port 472 non-transparent. Thus, should the active management module 406 come online in standby mode, the formerly active management module 406 would not be able to detect the fabric elements 418.

In the failover and power-on situations just described, it is assumed that the switch fabric module 460 is already present in the system when the failover or power-on occurs. When the switch fabric module 460 is hot-plugged into the system, the active management module 406 can execute a similar procedure to add the hot-plugged switch fabric module 460 to the system.

Figure 5A:
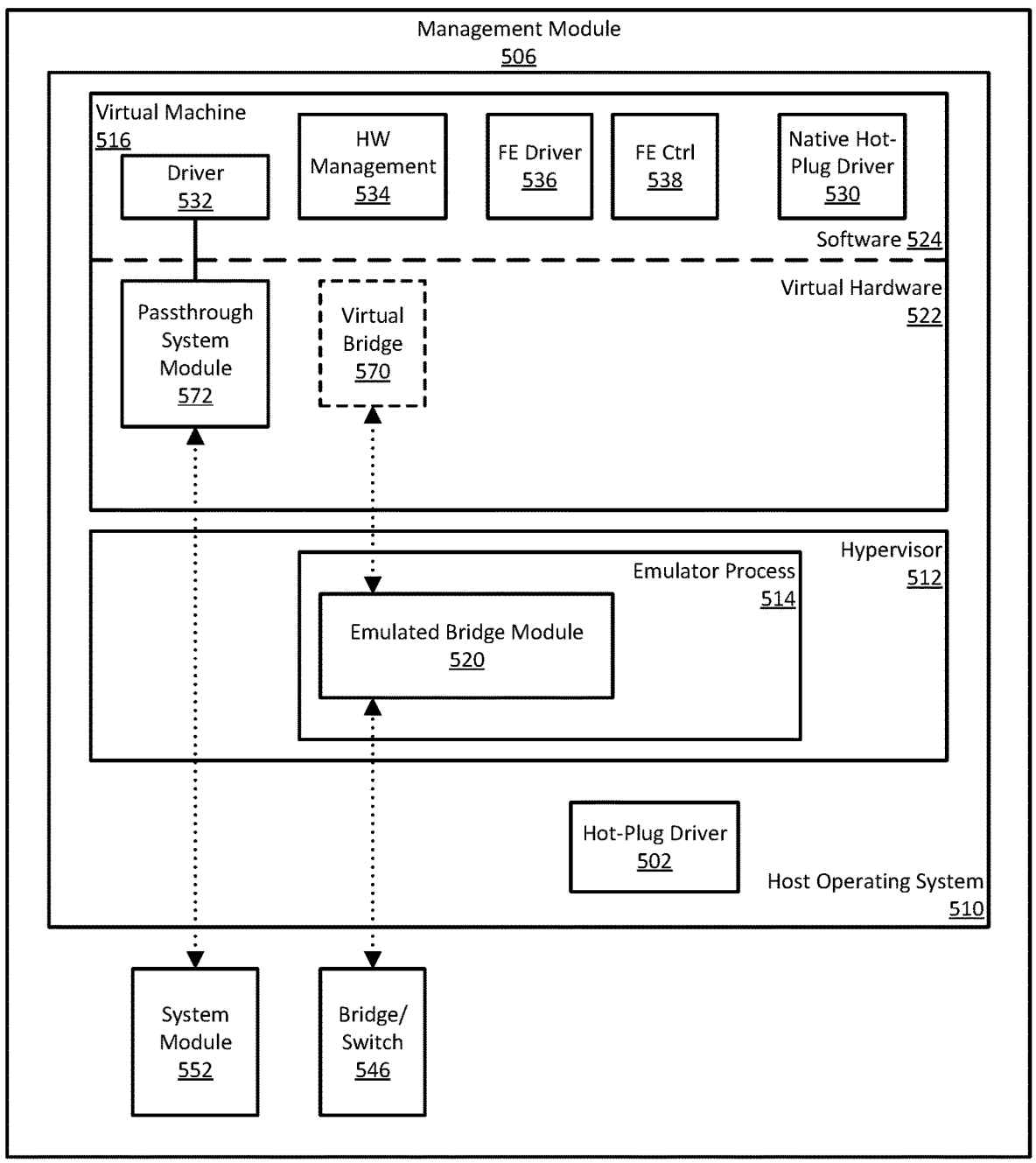
FIGS. 5A-5B illustrate an example of a management module and the software configuration of the management module.
Figure 5B:
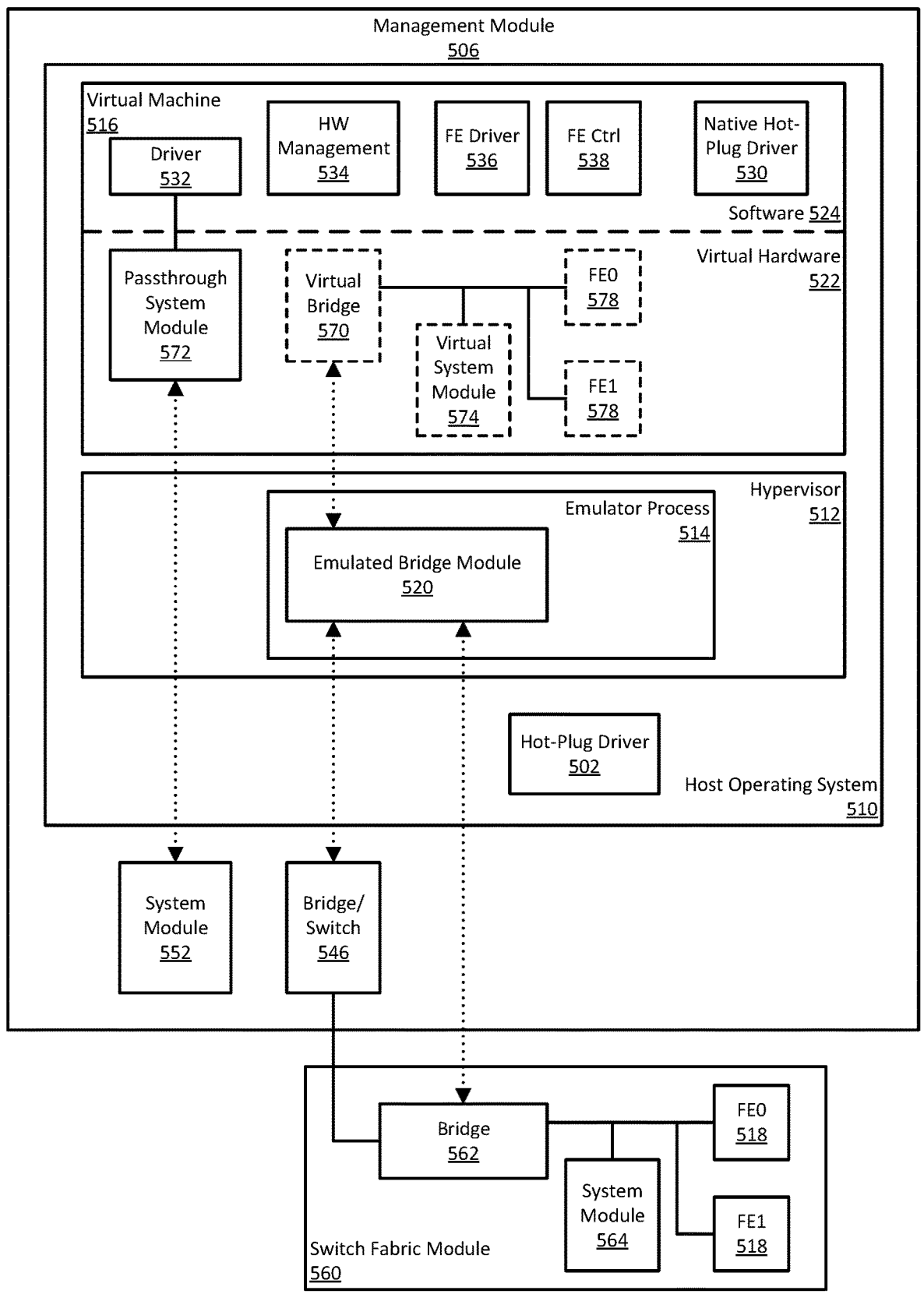

"Adding" a switch fabric module to a network device involves both the physical insertion of the switch fabric module into the chassis of the network device, and configuration of the software of a management module, so that the software is aware of, and can make use of, the newly added switch fabric module. FIGS. 5A-5B illustrate an example of a management module 506 and the software configuration of the management module 506. In this example, the management module 506 has been configured to support hot-plug of components such as switch fabric modules. FIG. 5A illustrates an example of the configuration of the management module 506 before a switch fabric module has been hot-plugged to the management module 506, and FIG. 5B illustrates an example of the configuration of the management module 506 after the switch fabric module has been hot-plugged.

In the example of FIG. 5A, the hardware of the management module 506 can include a system module 552 and a combined bridge switch 546. As discussed previously, the system module 552 facilitates detection of hot-plugged components, and the combined bridge/switch 546 can connect devices on a hot-plugged component to a bus complex of the management module 506. The bridge/switch 546 can include multiple downstream ports (e.g., two, six, eight, sixteen, or more ports), each of which can be used to connect a different hot-pluggable component. The system module 552 and the bridge/switch 546 can be implemented as discrete integrated circuits or as a combined integrated circuit. For example, the system module 552 can be implemented using a Field Programmable Gate Array (FPGA) and the bridge/switch 546 can be implemented using an Application Specific Integrated Circuit (ASIC). The management module 506 can also include one or more processors, which are not illustrated here.

The software of the management module 506 can include a host operating system 510, which can provide an environment in which various software applications can be run. In this example, these software applications include a hypervisor 512 and a virtual machine 516. Other processes can also be running in the host operating system 510, such as a hot-plug driver 502, which is discussed further below. The host operating system 510 can be said to be running "natively" on the management module 506, meaning that the host operating system 510 has direct access to, and control of, the hardware of the management module 506. Processes running in the host operating system 510 may similarly have direct access to the hardware of the management module 506.

The hypervisor 512 is an application that generates and runs virtual machines, such as the illustrated virtual machine 516. The hypervisor 512 can also be referred to as a virtual machine monitor (VMM). In some implementations, the hypervisor 512 can be integrated into the host operating system 510. For example, the Kernel-based Virtual Machine (KVM) is a virtualization infrastructure for the Linux kernel that enables the Linux kernel to operate as a virtual machine monitor.

In various implementations, the hypervisor 512 can include an emulator process 514. The emulator process 514 can provide hardware virtualization, that is, virtualized representations of the physical hardware. The virtualized hardware can closely resemble the physical hardware of the management module 506. Alternatively or additionally, the virtualized hardware can hide some characteristics of the physical hardware, and thus provide a more abstract view of the hardware. In some cases, the virtualized hardware may only minimally resemble physical hardware, or can include representations of hardware that is not present in the management module 506. In various implementations, the hypervisor 512 includes one emulator process for each virtual machine being controlled by the hypervisor. One example of an emulator process is Quick Emulator (QEMU).

In this example, the emulator process 514 includes an emulated bridge module 520. As discussed further below, the emulated bridge module 520 can correspond to one or more physical bridges in the system. For example, the emulated bridge module 520 can represent the combined bridge/switch 546. In various implementations, the emulator process 514 can include an emulated bridge module 520 for each slot in the chassis that can accept a hot-pluggable device. In these implementations, the emulated bridge module 520 can correspond to a downstream port of the bridge/switch 546. As discussed further below, the emulated bridge module 520 can correspond to a virtual bridge 570 in the virtual machine 516.

The virtual machine 516 includes various virtual hardware 522 components and software 524 components. The virtual hardware 522 components can include representations of the hardware of the management module 506, and possibly also representations of hardware that the management module 506 does not have. In the illustrated example, as noted above, the virtual hardware includes virtual bridge 570. From the perspective of applications executing in virtual machine 516, the virtual bridge 570 appears to be one device, though, as discussed further below, the virtual bridge 570 may, in fact, correspond to several physical devices.

In the illustrated example, the virtual hardware 522 also includes a passthrough system module 572. The passthrough system module 572 corresponds to the physical system module 552 on the management module 506, and has been labeled "passthrough" because the virtual machine 516 has been given "passthrough" access to the system module 552. Passthrough mode gives a virtual machine direct access to a device. Without passthrough mode, the virtual machine 516 would access the system module 552 through the hypervisor 512. For example, the emulator process 514 could include an emulated system module that corresponds to the physical system module 552. Alternatively or additionally, signals to and from the system module 552 would be verified and possibly translated by the hypervisor. With passthrough mode, the virtual machine 516 can, through the passthrough system module 572, access the system module 552 without the hypervisor 512 needing to assist. Generally, a passthrough device can only be used by one virtual machine at a time.

In the illustrated example, the virtual machine 516 of this example also includes various software applications, including a driver 532 for the system module 552, hardware management 534 application(s), a fabric element driver 536, a fabric element controller 538, and a native hot-plug driver 530. The driver 532 is a device driver program that controls the system module 552, through the passthrough system module 552. The hardware management 534 application(s) can manage the various hardware components of the network device in which the management module 506 is installed. For example, the hardware management 534 applications(s) can configure the network device to supply power to switch fabric modules and line cards. The fabric element driver 536 is a device driver program that controls fabric elements on switch fabric modules. The fabric element driver 536 can control the operations of fabric elements, in addition to providing an interface through which the virtual machine 516 can access the fabric elements. The fabric element controller 538 can provide this interface so that the fabric elements can be used by routing applications in the virtual machine 516. The native hot-plug driver 530 is an application provided with the operating system and/or bus architecture that manages hot-plug operations. For example, the native hot-plug driver 530 may be an Advanced Configuration Power Interface (ACPI) driver, which, among other things, provides an operating system with the ability to discover and configure hardware components.

FIG. 5B illustrates an example of the configuration of the management module 506 after a switch fabric module 560 has been hot-plugged into the network device in which the management module 506 is operating.

In the illustrated example, the switch fabric module 560 includes a bridge 562, a system module 564, and one or more fabric elements 518. The bridge 562 can provide a connection between devices on the switch fabric module 560 and the management module. For example, the bridge 562 can connect to pins, wires, and/or traces in the network device that connect the bridge 562 to the combined bridge/switch 546 on the management module 506. Once connected, in various implementations, the bridge 562 can thereafter simply pass data upstream or downstream. In some implementations, the bridge 562 can also translate between an upstream bus protocol and a downstream bus protocol, which may be different from the upstream bus protocol.

As discussed above, the system module 564 on the switch fabric module 560 can enable the system module 552 on the management module 506 to detect the presence of the switch fabric module 560 in the system. Specifically, when the switch fabric module 560 connects to the system, the system module 564 can connect pins, wires, and/or traces to the system module 552 on the management module 506. The system module 564 on the switch fabric module 560 may then signal its presence to all other system modules that may be listening to the wires and/or traces, and/or the other system modules (including the system module 552 of the management module 506) may automatically detect the presence of a new device.

In the illustrated example, the system module 564 connects to the management module 506 through the bridge 562 on the switch fabric module 560 and the bridge/switch 546 on the management module 506. In other examples, the system modules 564, 552 may have a dedicated bus, and may not need to communicate through the bridges 546, 562.

Upon detecting the presence of the system module 564 on the switch fabric module 560, the system module 552 on the management module 506 can inform the virtual machine 516 that a new component has been hot-plugged into the system. For example, the system module 552 can issue an interrupt. In this example, the interrupt would automatically appear as coming from the passthrough system module 572 because of the passthrough configuration of the passthrough system module 572.

In various implementations, the interrupt can be received in the software 524 of the virtual machine 516 by the system module driver 532. The driver 532 can then initiate a procedure to add the components on the switch fabric module 560 to both the physical hardware that is known to the management module 506 and the virtual hardware 522 that is available within the virtual machine 516. This procedure can include, for example, notifying the hardware management 534 application(s) to enable power to the switch fabric module 560. The procedure can also include instructing the virtual bridge 570 to attach to the hot-plugged components. In some implementations, a hardware management 534 application instructs the virtual bridge 570 to make these connections.

At this point, however, the virtual bridge 570 has no information about any components to connect to. This is because, though the switch fabric module 560 has been physically connected to the system, there is no corresponding representation of the switch fabric module 560, or its components, within the virtual hardware 522 of the virtual machine 516. In fact, the host operating system 510, at this point, also does not know that new hardware has been added to the system. If the new hardware is not known to the host operating system 510, the virtual machine 516 is unable to use the new hardware.

To establish the presence of the switch fabric module's components in both the host operating system 510 and the virtual machine 516, the emulated bridge module 520 can work in conjunction with the hot-plug driver 502. Because the virtual bridge 570 corresponds directly to the emulated bridge module 520, the command issued to the virtual bridge 570 to add the hot-plugged components is received by the emulated bridge module 520. The emulated bridge module 520 can be configured to inform the hot-plug driver 502 that a hot-plug has occurred that has added components to the system.

In various implementations, the hot-plug driver 502 can subsequently scan for new devices. For example, the hot-plug driver 502 can scan the downstream ports of the bridge/switch 546 and discover the bridge 562 on the switch fabric module 560 The hot-plug driver 502 can further scan buses downstream from the bridge 562, and discover the system module 564 and fabric elements 518. In various implementations, the hot-plug driver 502 can inform the host operating system 510 to add these newly discovered devices. For example, the hot-plug driver 502 can activate a hot-plug mechanism built into the host operating system 510. The built-in mechanism can, for example, create a device node for the system module 564 and each of the fabric elements 518. In this example, applications in the host operating system 510 can thereafter access the devices through these device nodes.

Once the system module 564 and fabric elements 518 have been added in the host operating system 510, the hot-plug driver 502 can inform the emulated bridge module 520 that these components are now part of the hardware in the system. In various implementations, the hot-plug driver 502 can provide additional information to the emulated bridge module 520, such as for example identities and/or descriptions of the new components. In various implementations, the emulated bridge module 520 can add the bridge 562 on the switch fabric module 560 to the hardware that is represented by the emulated bridge module 520. In this way, the virtual bridge 570 in the virtual machine 516 need not be modified to accommodate the additional bridge 562.

By mapping itself to the bridge 562 on the switch fabric module 560, the emulated bridge module 520 can gain access to the system module 564 and fabric elements 518, and any other components that may be connected to the bridge 562 on the switch fabric module 560. By being represented as a virtual bridge 570 in the virtual machine 516, any devices connected to the emulated bridge module 520 are also accessible as virtual hardware 522 in the virtual machine 516. In the illustrated example, the system module 564 is represented by a virtual system module 574 and the fabric elements 518 are represented by virtual fabric elements 578. The virtual system module 574 and the virtual fabric elements 578 are referred to as "virtual" here to distinguish these modules form the physical system module 564 and the physical fabric elements 518 on the switch fabric module 560. In various implementations, the virtual system module 574 and the virtual fabric elements 578 do not have corresponding emulated hardware, for example in the emulator process 514. Instead, the virtual machine 516 can access the components of the switch fabric module 560 as passthrough devices.

Once the new components are connected to the virtual bridge, the native hot-plug driver 530 can detect the presence of the new components. The native hot-plug driver 530 can execute various operations to add these components to the virtual hardware that is known to the virtual machine 516. For example, the native hot-plug driver 530 can notify the fabric element driver 536 that there are new virtual fabric elements 578 available. In this example, the fabric element driver 536 can configure the virtual fabric elements 578, thereby configuring the physical fabric elements 518. The fabric element driver 536 can enable management of the virtual fabric elements 578 by the fabric element controller 538. The physical fabric elements 518 can then be used by applications executing in the virtual machine 516.

The preceding discussion assumes that the management module 506 is an active management module. When the management module 506 is in standby mode and the switch fabric module 560 is hot-plugged into the system, in various implementations the system module 552 on the management module 506 can recognize the presence of the newly added switch fabric module 560. The system module 552, however, would not initiate the procedure to add the components of the switch fabric module 560 to host operating system 510 and to the virtual machine 516.

In some cases, the switch fabric module 560 can also be hot-plugged out of the system. In these cases, a similar procedure can occur to remove the components of the switch fabric module 560 from the host operating system 510 and from the virtual machine 516. For example, the system module 552 on the management module 506 can detect that the system module 564 has been removed or else is otherwise no longer accessible. In this example, the system module 552 can send an interrupt that is received by the driver 532 in the virtual machine 516, by way of the passthrough system module 572. The driver 532 can, for example, cause the hardware management 534 application(s) to instruct the virtual bridge 570 to detach the virtual system module 574 and virtual fabric elements 578. This instruction can be received by the emulated bridge module 520, which can inform the hot-plug driver 502. The hot-plug driver 502 may cause the devices to be deleted from the host operating system 510. Once the components are removed from the host operating system 510, the hot-plug driver 502 can inform the emulated bridge module 520, which can then disconnect and delete the virtual system module 574 and virtual fabric elements 578.

The above procedure for hot-plugging a switch fabric module into the system has been described assuming that the switch fabric module 560 has been inserted into the chassis after the management module 506 has powered on and put itself into an operative state. A similar process can be executed when the management module 506 powers on and finds the switch fabric module 560 already present and powered on in the chassis. For example, as discussed above, when the management module 506 powers on, the components downstream from the bridge 562 on the switch fabric module 560 may not be visible, due to the bridge 562 being configured to be non-transparent. Once the management module 506 is booted, the management module 506 can make the bridge 562 transparent. The management module 506 can then scan for previously unknown devices. For example, the system module driver 532 can automatically scan for previously unknown system modules, and/or can scan the downstream ports of the bridge/switch 546 to find any components connected downstream from the bridge/switch 546. Once the components of the switch fabric module 560 are discovered, these components can be added as discussed above.

The hot-plug procedure to add components can also occur after the management module 506 has experienced certain events, such as a reboot of the virtual machine 516 and/or a reboot of the emulator process 514.

When the virtual machine 516 reboots or crashes, in various implementations, any devices (including the emulated bridge module 520) in emulator process 514 may be automatically reset. Upon resetting, the emulated bridge module 520 may delete or remove any devices that the emulated bridge module 520 is bridging to (e.g., the system module 564 and fabric elements 518 on the switch fabric module). The emulated bridge module 520 may also cause ports on the bridge/switch 546 to be disabled, effectively disconnecting the switch fabric module 560 (though not changing the physical connection to the switch fabric module 560). Once the virtual machine 516 has finished rebooting, the components of the switch fabric module 560 can be re-added to the system, using the procedure described above.

The virtual machine 516 on a standby management module 506 can also experience a reboot or crash. For standby management module 506, the switch fabric module 560 may have been detected, but the hot-plug process would not have been executed, and a virtual system module 574 and virtual fabric elements 578 would not have been added to the virtual machine 516. Thus, when the virtual machine 516 on a standby management module 506 reboots or crashes, the emulated bridge module 520 may also reset, but the hot-plug process will not be started.

The emulator process 514 may itself reboot or crash. When this occurs, any file opened by the emulator process 514 is closed, and any process started by the emulator process 514 may be terminated. In various implementations, shutting down of the emulator process 514 can be detected by the hot-plug driver 502. The hot-plug driver 502 can subsequently remove any devices associated with the emulator process 514 from the host operating system 510. For example, the hot-plug driver 502 can cause device nodes for the system module 564 and fabric elements 518 to be deleted from the host operating system 510. The hot-plug driver 502 can also disable the bridge/switch 546 port to which the switch fabric module 560 is connected. Once the emulator process 514 has been restarted, the hot-plug process may run again, and reconnect the devices.

In some cases, a reboot or crash of either the virtual machine 516 or the emulator process 514 may result in a failover. When the formerly active management module 506 comes up in standby mode, its system module 552 can detect the presence of the switch fabric module 560, but may take no action to connect the components of the switch fabric module 560 to the virtual machine 516.

Alternatively a switchover can be triggered by a network administrator. For example, the network administrator may cause a switchover so that a management module can be upgraded or swapped out. On an administrator-initiated switchover, in some implementations, the active management module can become the standby management module without undergoing a reboot. In these implementations, the emulator process 514 may not be aware that the mode of the management module 506 has changed. Thus, in these implementations, the management module 506 may include code (e.g., in the hot-plug driver 502) that is able to detect the changed state of the management module 506. The code can then automatically delete any switch fabric module 560 components that have added to the management module 506. The devices on the switch fabric module 560 may be deleted from both the virtual machine 516 and the host operating system 510.

When either a failover or switchover occurs, the management module 506 that comes up as active can execute the hot-plug procedure described above to hot-plug any switch fabric modules that are already present in the chassis.

Figure 6:
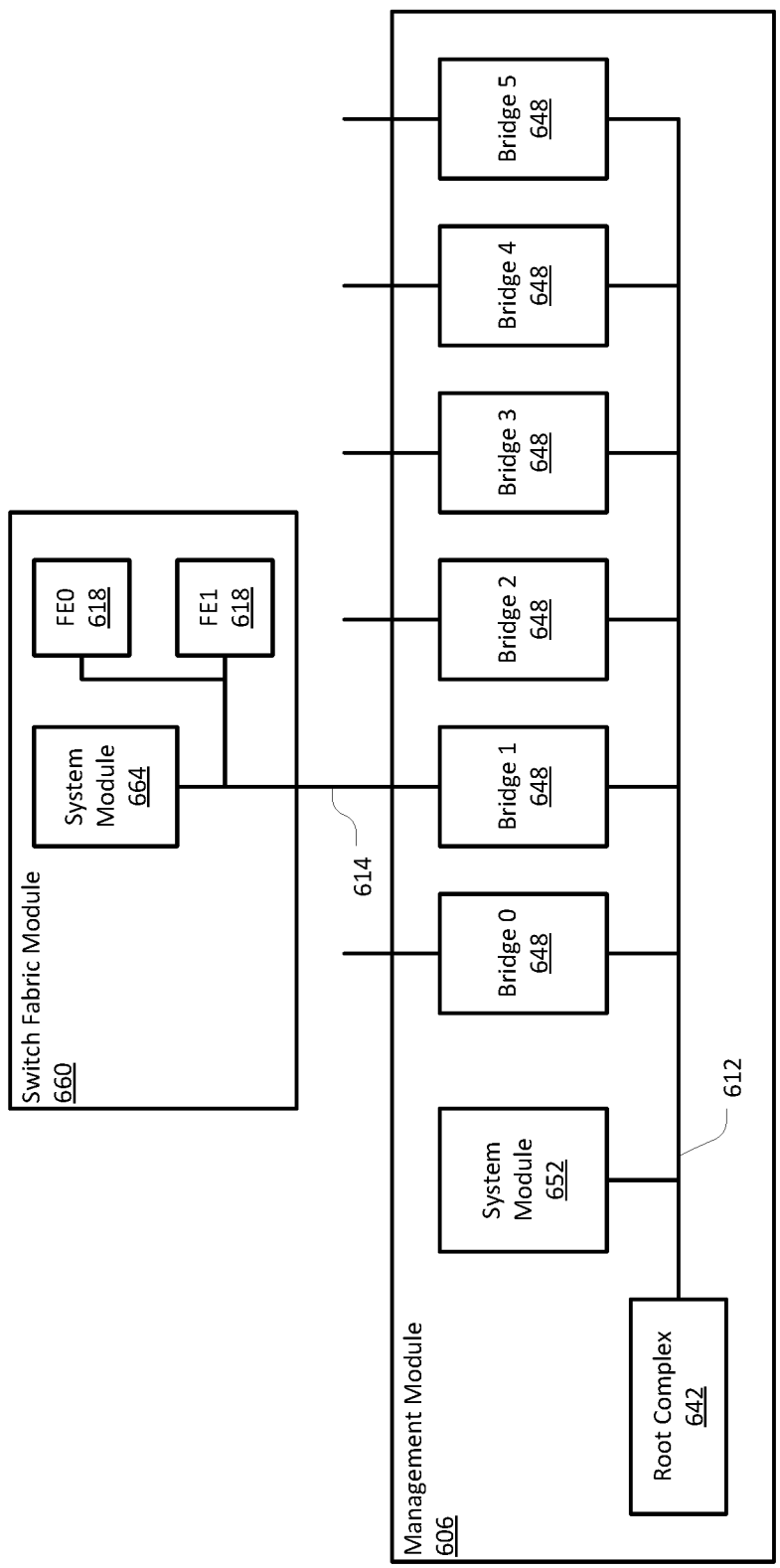
FIG. 6 illustrates an example of a configuration of a management module that can support hot-plug of multiple components.

The example of FIGS. 5A-5B discuss the hot-plug of one switch fabric module into the system. In various implementations, a management module can support hot-plug of multiple cards or modules. FIG. 6 illustrates an example of a configuration of a management module 606 that can support hot-plug of multiple components. FIG. 6 also illustrates a view that a virtual machine executing on the management module 606 may have of the hardware of the management module 606. That is, the hardware configured for the virtual environment of the virtual machine can resemble the example illustrated in FIG. 6, which may not correspond directly to the physical configuration of the hardware.

As discussed previously, a management module can have a root complex 642 through which processor(s) on the management module 606 can communicate with various components connected to a bus complex 612. In this example, components connected to the bus complex include a system module 652 and six bridges 648. The bus complex 612 can correspond to a physical bus complex on the management module 606. Similarly, the system module 652 can correspond to a physical system module device.

In various implementations, the physical management module 606 may not have six physical bridge components. As discussed previously, the management module 606 can have one combined bridge/switch with six (or more or fewer) ports. As also discussed previously, the management module 606 can include an emulated bridge for each of the ports of the combined bridge/switch. Each of these emulated bridges, in turn, can correspond to the six bridges 648 in the illustrated example.

In the example of FIG. 6, a switch fabric module 660 is connected to Bridge 1 648. The example switch fabric module 660 includes a system module 664 and two fabric elements 618. In various implementations, the switch fabric module 660 can have fewer or more fabric elements. A fabric element may be a multi-function device, and have two or more functions. In various implementations, when a fabric element 618 is a multi-function device, it may be represented as a multi-function device to the virtual machine.

In the illustrated example, each of the system module 664 and the two fabric elements 618 on the switch fabric module 660 are connected to a secondary bus complex 614, where "secondary" means that this bus complex is not directly connected to the root complex 642 of the management module 606. Bridge 1 648 enables a connection between the bus complex 612 on the management module 606 and the secondary bus complex 614, using bridging techniques.

In various implementations, the switch fabric module 660 also includes a physical bridge device, which can be made invisible to the virtual machine executing the management module 606. As discussed above, an emulated bridge can be configured to represent both the physical bridge/switch on the management module 606 and the physical bridge on the switch fabric module 660. Doing so can reduce complexity for the virtual machine, and enable more efficient communication with the system module 664 and the fabric element 618.

Figure 7:
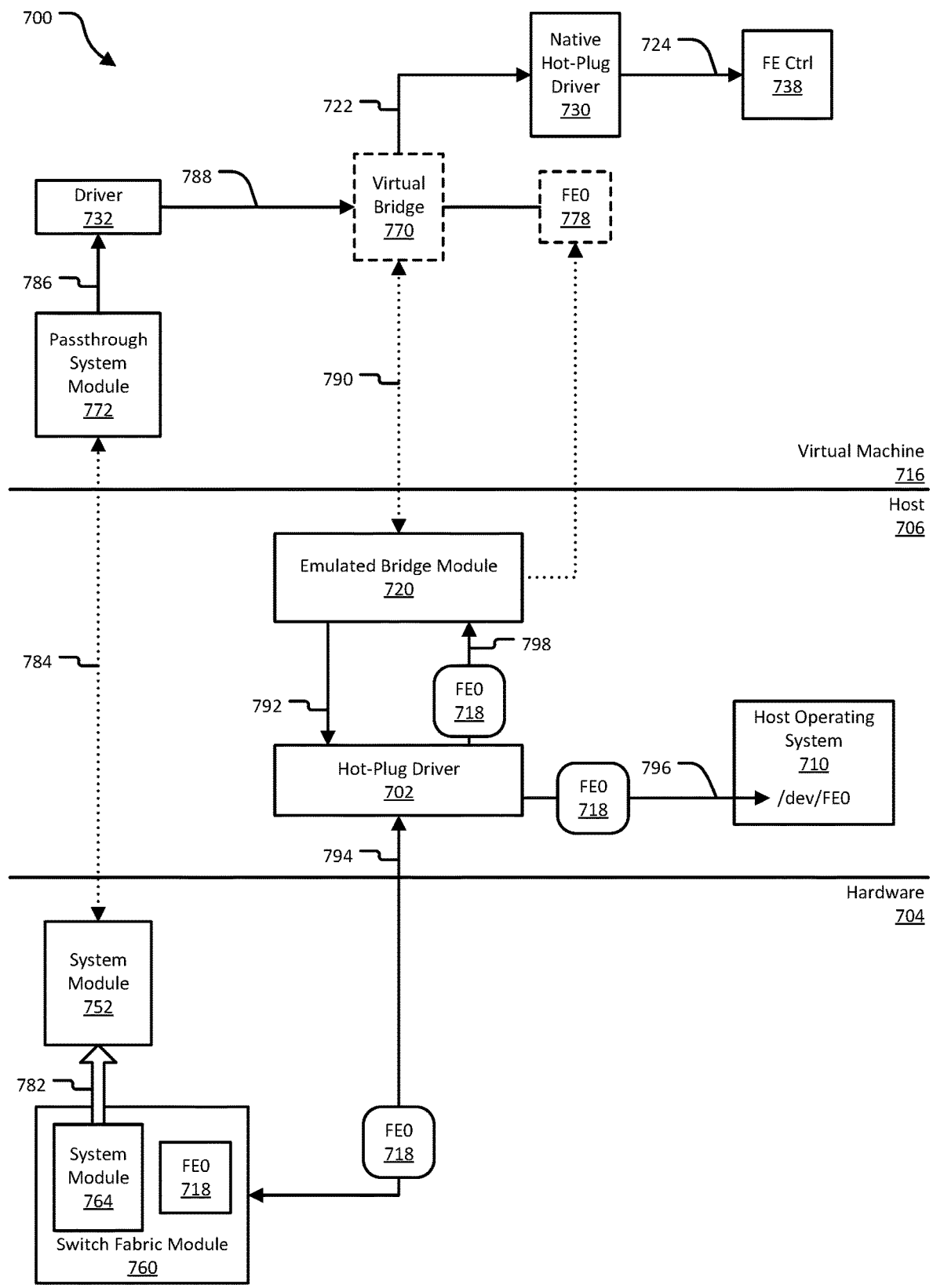
FIG. 7 illustrates an example of a process for hot-plugging a component into a network device, and forming connections between the new component and a management module.

FIG. 7 illustrates an example of a process 700 for hot-plugging a component into a network device, and forming connections between the new component and a management module. In the illustrated example, a switch fabric module 760 is added to the network device. In various implementations, a similar process 700 can apply when other components are hot-plugged into the network device. For example, when a management module is hot-plugged into the chassis, a similar process can be executed to connect the management module to already-present switch fabric modules 760.

The process 700 begins with the physical hardware 704 of the network device. At step 782, the switch fabric module 760 is physically inserted into the chassis of the network device. When this occurs, a system module 764 on the switch fabric module 760 can be connected to a system module 752 of the management module. The system module 752 on the management module can determine that the system module 764 on the switch fabric module 760 is new. Based on this determination, the system module 752 on the management module can generate an interrupt to inform the virtual machine 716 executing on the management module.

As discussed above, the system module 752 can be configured so that the virtual machine 716 has passthrough access to the system module 752. Because of the passthrough configuration, the system module 752 can appear as a virtual hardware component of the virtual machine 716 (here labeled the passthrough system module 772), which has a virtual link 784 to the physical system module 752. Thus, when the physical system module 752 issues an interrupt, the interrupt appears in the virtual machine 716 as coming from the passthrough system module 772.

At step 786, the interrupt from the passthrough system module 772 is received by a device driver 732 for the system module 752. The driver 732 can interpret the interrupt as meaning that new components have been hot-plugged into the system. At step 788, the driver 732 can send a command to a virtual bridge 770 in the virtual machine 716, to instruct the virtual bridge 770 to establish a connection to the new components. For example, the driver 732 can write, or cause to be written, a command called "SLOT_HP_ADD_MODULE" to the virtual bridge 770. In various implementations, the virtual bridge 770 can correspond to a specific slot from multiple slots in the network device that are available for hot-plugging.

As discussed previously, the virtual bridge 770 can correspond to an emulated bridge module 720, managed in a hypervisor running in the host 706 software of the network device. The virtual bridge 770 has a virtual link 790 to the emulated bridge module 720, so that any command received by the virtual bridge 770 is also received by the emulated bridge module 720. Thus, when the virtual bridge 770 receives a command to add components, the emulated bridge module 720 also receives the command.

At step 792, the emulated bridge module 720 can inform a hot-plug driver 702, also executing in the host 706 software, that there are new components to add. For example, the emulated bridge module 720 can use an ioctl interface to send a message to the hot-plug driver 702.

At this point, all that is known to the system is that new components are present. The system, however, does not know what the new components are. The hot-plug driver 702 can make this determination. At step 794, the hot-plug driver 702 can scan the network device to identify new hardware. For example, the hot-plug driver 702 can scan a port associated with the interrupt generated by the system module 752 on the management module. In this example, as a result of the scan, the hot-plug driver 702 can discover a fabric element 718. The hot-plug driver 702 can also find other components, such as the system module 764 and other fabric elements. The remaining steps of the process 700 can be applied to any of these other components.

At step 796, the hot-plug driver 702 can instruct the host operating system 710 to add the fabric element 718. In various implementations, the host operating system 710 can have built-in functions for hot-plugging a new component, which can be triggered at step 796. At the conclusion of step 796, the fabric element 718 is understood to be a known hardware component of the network device.

At step 798, the hot-plug driver 702 can provide information about the fabric element to the emulated bridge module 720. For example, the hot-plug driver 702 can send an event to the emulated bridge module 720. The emulated bridge module 720 can then establish a connection to the fabric element 718. Once this connection is formed, the fabric element 778 can appear as a virtual fabric element 778 attached to the virtual bridge 770.

To complete the hot-plug of the virtual fabric element 778 into the virtual machine, at step 722 the virtual bridge 770 can cause a native hot-plug driver 730 in the virtual machine 716 to be informed that a new virtual hardware component has been added to the virtual machine 716. The native hot-plug driver 730 can take any necessary steps to add the virtual fabric element 778 to the operating environment of the virtual machine 716. These steps can include calling a driver (not illustrated here) for the fabric elements, which may execute a probe function to learn more about the virtual fabric element 778. In various implementations, the native hot-plug driver 730 can be a component of the guest operating system executing in the virtual machine 716. Alternatively or additionally, in various implementations, the native hot-plug driver 730 can be associated with a bus protocol, such as PCIe.

At step 724, the native hot-plug driver 730 can also inform a fabric element controller 738 that a new virtual fabric element 778 is present. This can establish a connection between the fabric element controller 738 and the virtual fabric element 778. Thereafter, the fabric element controller 738 can manage and maintain the virtual fabric element 778, and through the virtual fabric element 778 the physical fabric element 718.

Figure 8:
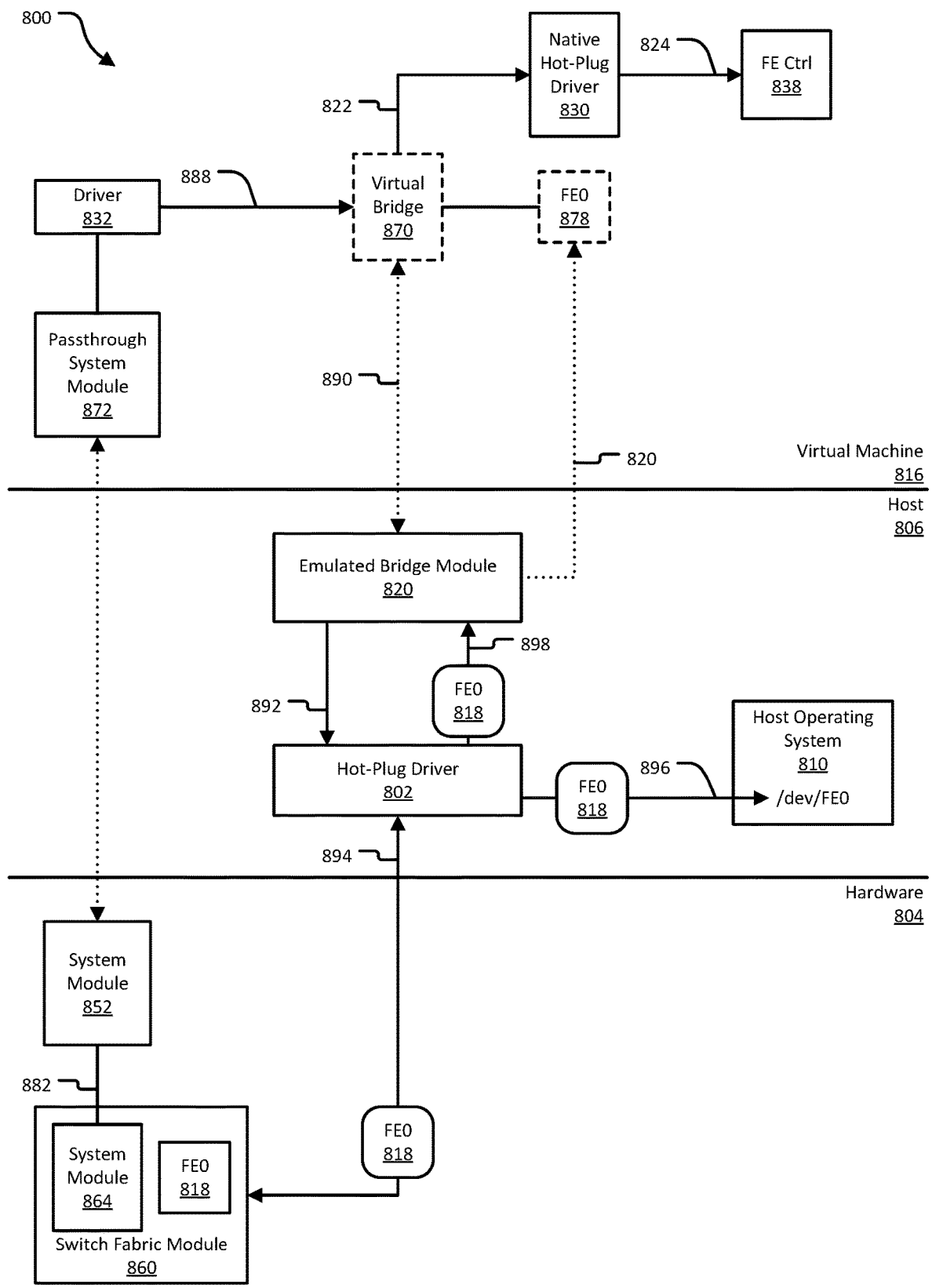
FIG. 8 illustrates an example of a process for hot-plugging a component that is present in a network device when a boot-up occurs.

FIG. 8 illustrates an example of a process 800 for hot-plugging a component that is present in a network device when a boot-up occurs. In the illustrated example, a switch fabric module 860 is present in the hardware 804 of the network device when the network device is booted and/or when a management module comes online (e.g., the management module is rebooted and/or hot-plugged into the network device). The process 800 can also apply when the virtual machine 816 is booted or rebooted on a management module that has been powered on and in operation for some time. In various implementations, a similar process can apply for other components that are present in the network device when the management module and/or the virtual machine boots.

In various implementations, when the management module boots, the management module can be configured to automatically launch a virtual machine 816. As discussed above, the virtual machine 816 can be executing a network operating system that controls the operations of the network device. When the virtual machine 816 launches a device driver 832 for the system module 852 on the management module, the driver 832 can be configured to automatically, at step 888, instruct a virtual bridge 870 to scan for components connected to the virtual bridge 870 so that those components can be added to the virtual machine.

In some implementations, the system module 852 on the management module may be able to determine that the system module on the switch fabric module 860 is new and/or previously unknown to the management module. In these implementations, the process illustrated in FIG. 7 may apply, in which the system module 852 of FIG. 8 would issue an interrupt that is received in the virtual machine 816 by way of a passthrough system module 872. In some implementations, however, the connection 882 between the system module 852 on the management module and the system module 864 on the switch fabric module may be established when the network device is powered on, when management module is powered on, or when the switch fabric module is hot-plugged into the system, any of which may have occurred some time before the virtual machine is booted. In these implementations, the connection 882 between the system module 852, 864 may be indistinguishable from a connection to a module that is already known to the system. In these implementations, the process 800 would apply.

The command issued to the virtual bridge 870 at step 888 is received by an emulated bridge module 820 due to the virtual link 890 between the virtual bridge and the emulated bridge module 820. The emulated bridge module 820 is executing in the host 806 environment of the network device, along with other processes, such as a host operating system 810 and a hot-plug driver 802. At step 892, the emulated bridge module 820 can inform the hot-plug driver 802 that there are new and/or unknown components in the system.

At step 894, the hot-plug driver 802 can scan the network device for new and unknown components. For example, the hot-plug driver 802 can scan each slot in the chassis, including slots that can take hot-pluggable components and slots that cannot. The hot-plug driver 802 may subsequently discover a fabric element 818 on the example switch fabric module 860, as well as other components. These other components can be hot-plugged to the system in a similar fashion as the example fabric element 818.

At step 896, the hot-plug driver 802 can instruct the host operating system 810 to add the fabric element 818. Once added to the host operating system 810, the fabric element 818 becomes an accessible component in the hardware of the network device.

At step 898, the hot-plug driver 802 can provide information about the fabric element 818 to the emulated bridge module 820. The emulated bridge module 820 can then establish a connection to the fabric element 818. Once this connection is formed, the fabric element 818 can appear as a virtual fabric element 878, attached to the virtual bridge 870, in the virtual machine 816.

At step 822, the virtual bridge 870 can inform a native hot-plug driver 830 in the virtual machine 816 that a new component has been added to the virtual hardware of the virtual machine 816. The native hot-plug driver 830 can execute hot-plug operations, including initiating a fabric element driver and, at step 824, informing a fabric element controller 838 that a new virtual fabric element 878 is present.

Figure 9:
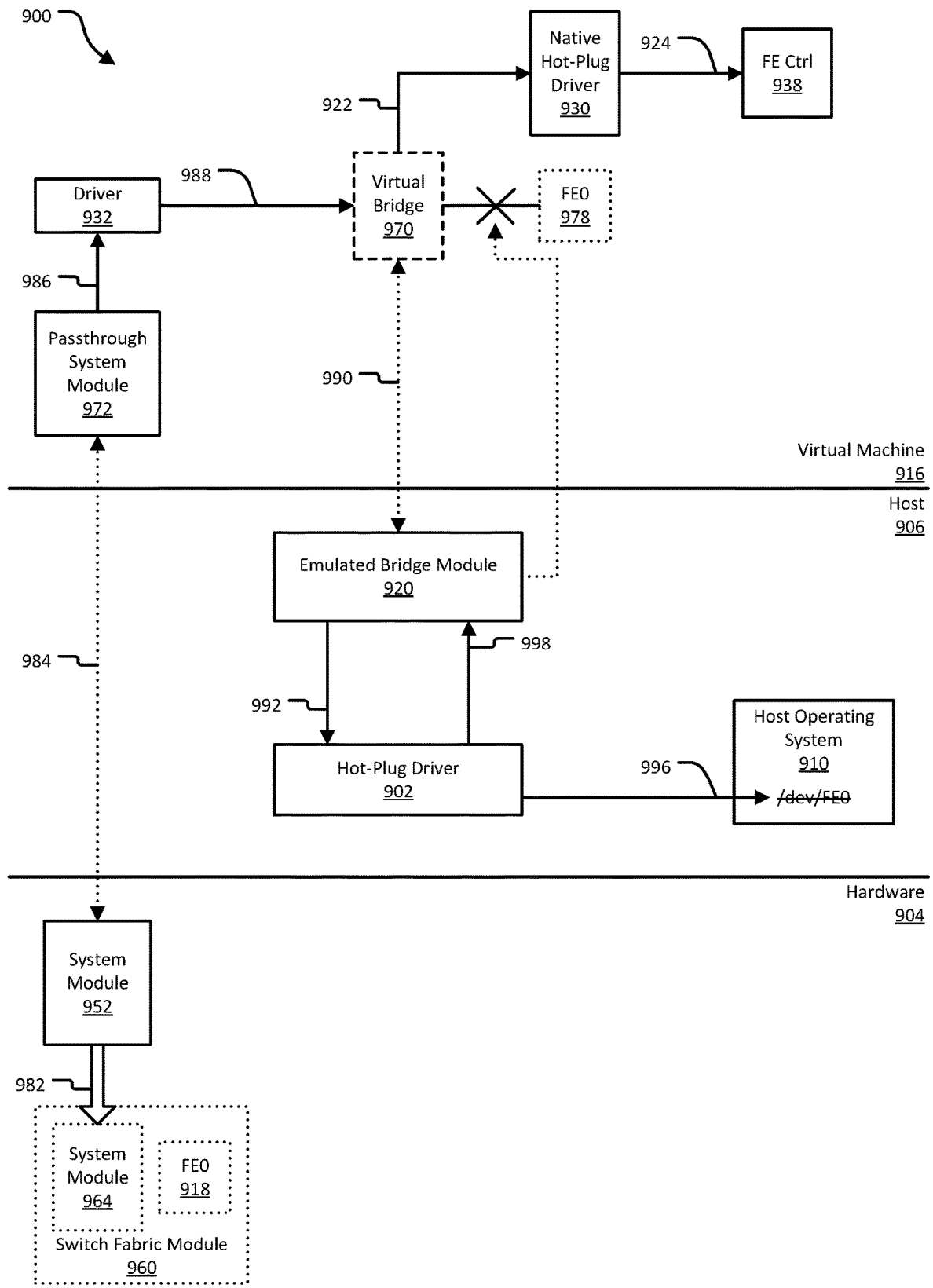
FIG. 9 illustrates an example of a process that can be executed when a component is removed from a network device in a hot-plug operation.

FIG. 9 illustrates an example of a process 900 that can be executed when a component is removed from a network device in a hot-plug operation. In the illustrated example, a switch fabric module 960 is removed from the network device. In various implementations, a similar process can be executed when other components are removed from the network device in a hot-plug operation.

The process 900 begins with the physical hardware 904 of the network device. At step 982, the switch fabric module 960 is physically removed from the chassis of the network device. When this occurs, a system module 952 on the management module can detect that a system module 964 on the switch fabric module 960 is no longer present. The system module 952 on the management module can issue an interrupt to inform the virtual machine 916 that some components in the system have been removed.

Due to the virtual link 984 between the system module 952 and a passthrough system module 972 in the virtual machine 916, the interrupt form the system module 952 will be seen in the virtual machine 916 as coming from the passthrough system module 972.

At step 986, the interrupt will be received by a device driver 932 for the system module 952. The driver 932 can interpret the interrupt as meaning that components have been removed from the system. At step 988, the driver 932 can send a command to a virtual bridge 970 in the virtual machine 916, to instruct the virtual bridge 970 to remove connects to the removed components. For example, the driver 732 can write, or cause to be written, a command called "SLOT_HP_DELETE_MODULE" to the virtual bridge 970. In various implementations, the virtual bridge can correspond to the specific slot from which the switch fabric module 960 was removed.

The virtual bridge 970 has a virtual link 990 to an emulated bridge module 920 executing in the host 906 software environment. Thus, the emulated bridge module 920 can receive the command issued to the virtual bridge 970 at step 988. The emulated bridge module 920 can, at step 992, inform a hot-plug driver 902 that components have been removed from the system.

Because the emulated bridge module 920 can correspond to a specific slot in the chassis, the hot-plug driver 902 can assume that all of the components associated with the slot have been removed. The hot-plug driver 902 can thus, at step 996, inform the host operating system 910 which components have been removed. The host operating system 910 can delete handles to those components, at which point the components are no longer known to the system.

At step 998, the hot-plug driver 902 can also provide information describing the removed components to the emulated bridge module 920. The emulated bridge module 920 can disconnect and/or delete virtual representations of the removed components. For example, the emulated bridge module 920 can remove a virtual fabric element 978 that was formerly associated with a fabric element 918 on the removed switch fabric module 960.

At step 922, the virtual bridge 970 can further inform a native hot-plug driver 930 that the virtual fabric element 978 has been removed. The native hot-plug driver 930 can then execute hot-plug removal operations, including removing the virtual fabric element 978 from listings of virtual hardware and, at step 924, informing the fabric element controller 938 that the virtual fabric element 978 has been removed.

Figure 10:
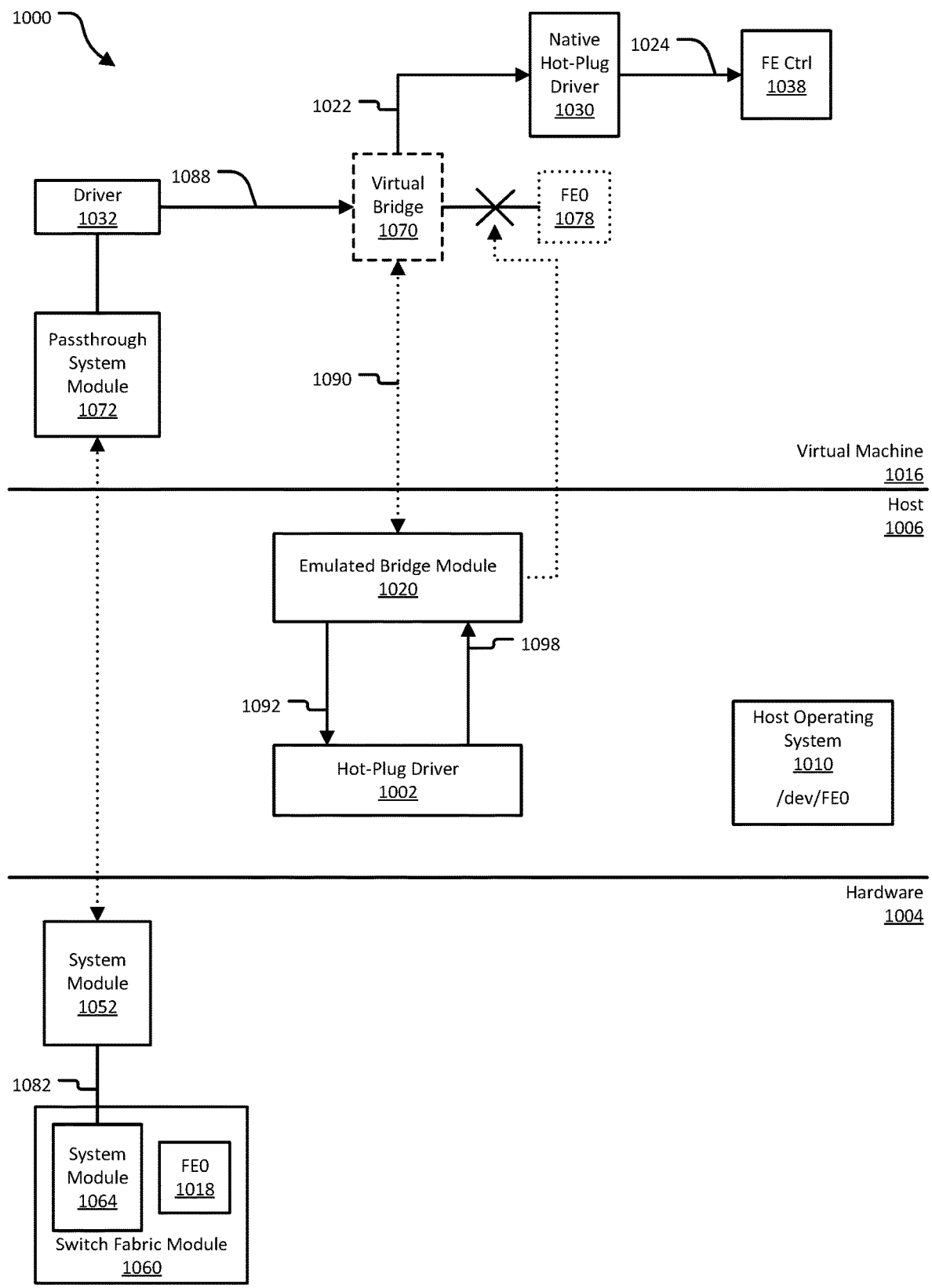
FIG. 10 illustrates an example of a process that can be executed when a virtual machine executing on a management module is shut down.

FIG. 10 illustrates an example of a process 1000 that can be executed when a virtual machine 1016 executing on a management module is shut down. The virtual machine 1016 may be shut down for various reasons. For example, the virtual machine 1016 can be shut down in a process for rebooting the virtual machine 1016. As another example, the virtual machine 1016 may be shut down in order to bring the virtual machine 1016 up in standby mode.

When the virtual machine 1016 executes shut-down procedures, these procedures can include "unplugging" or removing virtual hardware components, including a virtual fabric element 1078 that is associated with a physical fabric element 1018. These procedures may be executed so that host 1006 applications can be made ready for when the virtual machine 1016 comes up again. Additionally, the virtual machine 1016 can come up in either active or standby mode, and if the virtual machine 1016 comes up in standby mode, some hardware components (including, for example, the fabric element 1018 on the switch fabric module 1060) should be left disconnected.

To cleanly disconnect any physical hardware components from the virtual machine, at step 1088, a device driver 1032 for a system module 1052 on the management module (represented in the virtual machine as a passthrough system module 1072) can send an instruction to a virtual bridge 1070 in the virtual machine 1016. This instruction can inform the virtual bridge 1070 to disconnect and/or delete any virtual hardware components.

The virtual bridge 1070 has a virtual link 1090 to an emulated bridge module 1020 executing in the host 1006 software environment. Thus, the emulated bridge module 1020 can receive the command issued to the virtual bridge 1070 at step 1088. The emulated bridge module 1020 can, at step 1092, inform a hot-plug driver 1002 that components need to be removed from the virtual machine 1016.

Because the emulated bridge module 1020 can correspond to a specific slot in the chassis, the hot-plug driver 1002 can assume that all of the components associated with the slot need to be removed. The hot-plug driver 1002 can thus, at step 1098, provide information describing the removed components to the emulated bridge module 1020. The emulated bridge module 1020 can disconnect and/or delete virtual representations of the removed components. For example, the emulated bridge module 1020 can remove a virtual fabric element 1078 that was formerly associated with a fabric element 1018 on the removed switch fabric module 1060.

In some implementations, once the virtual fabric element 1078 has been disconnected, the virtual machine 1016 can be brought down. In some implementations, however, the virtual machine 1016 may execute additional operations to avoid potential problems that can interfere with shut down procedures. For example, at step 1022, the virtual bridge 1070 can inform a native hot-plug driver 1030 that the virtual fabric element 1078 has been removed. In this example, the native hot-plug driver 1030 can then execute hot-plug remove operations, including removing the virtual fabric element 1078 from listings of virtual hardware and, at step 1024, informing the fabric element controller 1038 that the virtual fabric element 1078 has been removed.

In various implementations, though the components of the switch fabric module 1060 have been removed from the virtual machine 1016, these components—including, for example, a system module 1064 and a fabric element 1018—would not also be removed from either the host operating system 1010 or from the physical hardware 1004 of the network device. Thus, for example, a connection 1082 between a system module 1052 on the management module and the system module 1064 on the switch fabric module 1060 is maintained. As another example, a handle to the fabric element 1018 can also be maintained by the host operating system 1010. The components of the switch fabric module 1060 can thus be ready to hot-plug again into the virtual machine 1016.

In some implementations, the bus architecture (such as, for example, PCIe-based bus architecture) that connects the cards and modules to each other in a network device can natively support the ability to hot swap or hot-plug the cards and modules. In some implementations, however, native hot swap support is disabled to avoid possible conflicts when management modules are hot swapped. For example, when a new management module is added to the network device, native hot-plug functionality in the hardware and/or software of the management module may attempt to discover and take control of any other devices connected to the bus complex. In this example, another management module, however, may already be in control of the devices in the bus complex. The new management module should not interfere with this other management module's control, or the network device may become non-functional.

In various implementations, a network device can thus include a customized hot-swap or hot-plug implementation that can be more robust than the native hot-plug implementation provided by the bus architecture. In the examples discussed above, the customized implementation can include a custom hot-plug driver.

In various implementations, the hot-plug driver can be neither a PCI driver nor a PCIe port service driver. For example, the hot-plug driver described herein generally does not attach to any specific hardware device. In various implementations, the hot-plug driver can instead be a software module that provides an ioctl interface, so that an emulator process in a hypervisor can access components in the system, such as bridges, and so that the emulator process can access a kernel Application Programming Interface (API) in the host operating system kernel. In various implementations, the emulated device in the emulator process and a driver in the virtual machine can define how this ioctl interface is used.

Figure 11:
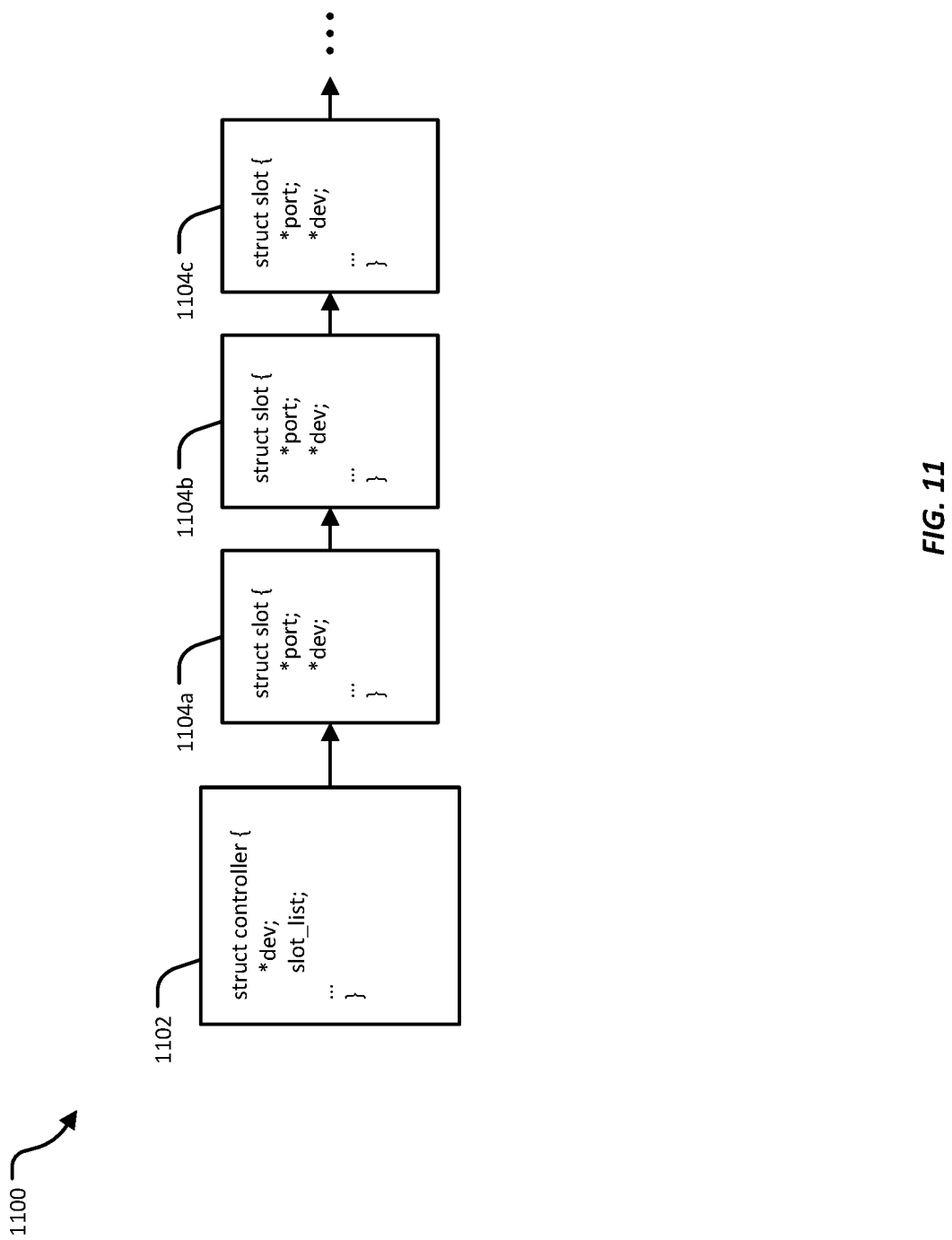
FIG. 11 illustrates examples of data structures that the hot-plug driver can use to represent hardware in the network device.

FIG. 11 illustrates examples of data structures 1100 that the hot-plug driver can use to represent hardware in the network device. The "struct controller" 1102 object type can be used to represent hardware in the management module, such as the bridge/switch. The "struct slot" 1104a-1104c can be used to represent a slot in the chassis. The controller structure may point to a list of slot structures 1104a-1104c, which each represent a different slot.

The struct controller 1102 can have a field called "dev" that can be used to point the bridge/switch in the kernel of the host operating system. The controller structure 1102 can further have a "slot_list" field that points to a list or array of slot structures 1104a-1104c.

The slot structures 1104a-1104c can have "port" and "dev" fields. The "port" field can be used to point to a hot-pluggable port on the bridge/switch, while the "dev" field can be used to point to a bridge on a switch fabric module. Using these structures, the hot-plug driver is able to access the registers in the bridge/switch, bridges on the switch fabric module, and hot-plug port registers.

The structures illustrated in FIG. 11 can be generated when a management module is initialized, regardless of whether there are any switch fabric modules in the chassis. The "dev" field in the slot structure can be set to NULL when no switch fabric module is present for that slot. When a switch fabric module is added, the "dev" field can point to the bridge on the switch fabric module, once this bridge has been added to the host operating system kernel.

The following illustrates an example of a function that may be used to initialize the hot-plug driver:

```
slot_hp_init( ) {
    shpc = kzalloc(*shpc);
    shpc->dev = slot_hp_find_controller_port( );
    init_slots(shpc) {
        foreach slot {
            struct *slot = kzalloc(*slot);
            slot->port = slot_hp_find_port(slot);
        }
    }
    misc_register(&slot_hp_dev);
}
```

The above function can be called once the hot-plug driver has been loaded into the host operating system kernel. The function can first allocate and initialize the controller structure 1102 described above. The function "slot_hp_find_controller_port( )" can initiate a search for devices in the kernel of the host operating system. This function can return a device node for the bridge/switch on the management module. The "init_slots( )" function can allocate and initialize slot structures (described above). The "slot_hp_find_port( )" function can search the kernel for device nodes, and can locate a hot-plug port device.

In some implementations, the search operations may be based on the PCI bus system structure. In some cases, the search operations may not rely on assigned bus numbers. The PCI devices can be searched by the slot address on the busses, from one PCI bus layer to the next, starting from the root bus.

At the end of initialization, the hot-plug driver can register a character device, and create, for example, a device node "/dev/slot-hp" for an emulated bridge module in an emulator process. The emulator process can then access the hot-plug driver through this device node.

In various implementations, the hot-plug driver can provide access to the bridges and the operating system kernel through an ioctl interface. These accesses can include accesses to physical memory, configuration registers, bridges, and/or other driver functions. Table 1 illustrates examples of various ioctl commands, or opcodes. Most of these commands read or write memory or registers. The "SLOT_IOC_SLOT_CONTROL" command, which enables or disables a slot, can be blocked by some events, and thus in some implementations may be executed in a separate process thread. In various implementations, the hot-plug driver ioctl interface can only be used from the host operating system, and cannot be accessed by the virtual machine.

TABLE 1

| Opcodes | Descriptions |
| --- | --- |
| SLOT_IOC_MEM_READ | Reads physical memory |
| SLOT_IOC_MEM_WRITE | Writes physical memory |
| SLOT_IOC_PCI_CONFIG_READ | Reads PCI configuration register |
| SLOT_IOC_PCI_CONFIG_WRITE | Writes PCI configuration register |
| SLOT_IOC_PORT_CONFIG_READ | Reads hotplug port configuration register |
| SLOT_IOC_PORT_CONFIG_WRITE | Writes hotplug port configuration register |
| SLOT_IOC_CTLR_IO_READ | Reads MM PEX I/O register |

TABLE 1-continued

| Opcodes | Descriptions |
| --- | --- |
| SLOT_IOC_CTLR_IO_WRITE | Writes MM PEX I/O register |
| SLOT_IOC_CTLR_CONFIG_READ | Reads MM PEX configuration register |
| SLOT_IOC_CTLR_CONFIG_WRITE | Writes MM PEX configuration register |
| SLOT_IOC_SLOT_IO_READ | Reads SFM PEX I/O register |
| SLOT_IOC_SLOT_IO_WRITE | Writes SFM PEX I/O register |
| SLOT_IOC_SLOT_CONFIG_READ | Reads SFM PEX configuration register |
| SLOT_IOC_SLOT_CONFIG_WRITE | Writes SFM PEX configuration register |
| SLOT_IOC_SLOT_CONTROL | Enables or disables a slot |
| SLOT_IOC_SET_SLOT_ID | Connects file descriptor to a slot |
| SLOT_IOC_GET_INFO | Reads driver info such as the total number of SFMs |
| SLOT_IOC_SET_EVENTFD | Registers eventfd to hotplug driver. The eventfd will be signaled in QEMU when a hotplug event is queued in hotplug driver. |
| SLOT_IOC_READ_EVENT | Reads hotplug event in hotplug driver queue |
| SLOT_IOC_RESET | Resets a slot |

A slot enable operation can scan hot-plug ports, and add to the host operating system kernel any devices found connected to that port. A step in a slot enable operation may be to configure a device. The following provides an example of a slot enable function:

```
slot_enable(slot) {
    slot_hp_configure_device(slot) {
        pci_scan_slot(slot->port);
        foreach_bridge (dev) {
            pci_scan_bridge(dev);
        }
        pci_assign_unassigned_bridge_resources( );
        slot_get_dev(slot);
        slot_hp_add_devices(slot);
    }
}
```

In this example, the function can first scan hot-plug ports. For any bridge that may be found by this scan, the function can also scan the bridge's downstream bus. The scan operation can then locate any devices connected to the downstream bus. This process may continue until all bridges have been found.

After all devices have been found and attached to the port, the "pci_assign_unassigned_bridge_resources( )" function can assign memory windows to any new bridges, and address spaces for any new devices. The "slot_get_dev( )" function can then search among the kernel devices for the bridge on the switch fabric module. This function can further create an I/O map for the memory region of this bridge. The "slot_hp_add_devices( )" function can look for new devices on the switch fabric module. It may also queue and send events to the emulator process.

A slot disable operation can disable a slot. A step in the slot disable operation may be to remove the configuration for a device attached to the slot. The following provides an example of a slot disable function:

```
slot_disable(slot) {
    slot_hp_unconfigure_device(slot) {
        slot_hp_delete_devices(slot);
        slot_put_dev(slot);
        foreach_device(dev) {
            pci_stop_and_remove_bus_device(dev);
        }
    }
}
```

In this function, the "slot_hp_delete_devices( )" function can queue and send events to the emulator process. These events can unplug any devices on the switch fabric module from the emulated bridge module. The "slot_put_dev( )" function can remove the I/O map from the bridge on the switch fabric module. For each device, the "pci_stop_an-d_remove_bus_device( )" function can stop the device function and delete the device node in the kernel.

As discussed above, an emulated bridge module can be configured to represent both the bridge/switch on the management module and the bridge on the switch fabric module. The emulated bridge module can also provide high-level hot-plug functions to the management module's virtual machine. In various implementations, the device type of the emulated bridge module can be "pci-slot," which may be based on the "pci-bridge-dev" device type. A pci-slot device is a pci-bridge with additional vendor-specific capabilities. A pci-slot device can have an eventfd file type.

Figure 12:
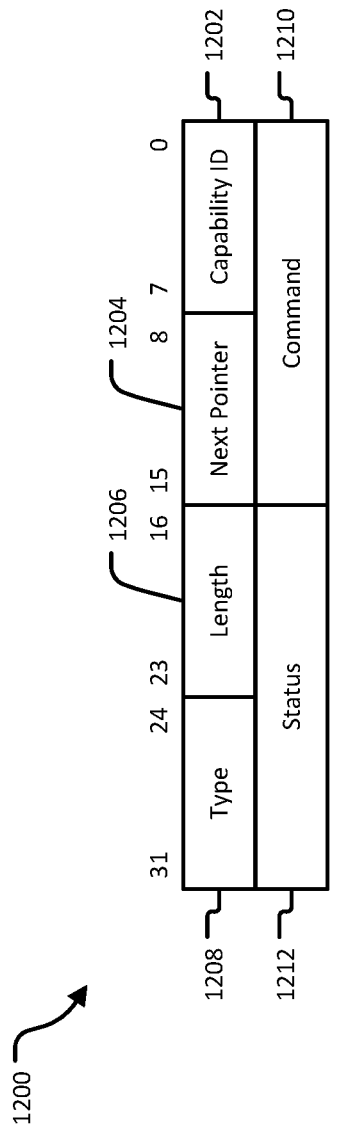
FIG. 12 illustrates an example description for a vendor-specific capability register that can be included in the emulated bridge module.

FIG. 12 illustrates an example description for a vendor-specific capability register 1200 that can be included in the emulated bridge module. In various implementations, the illustrated vendor-specific capability can be encoded in eight bytes. In this example, the first byte is 0x9 (hexadecimal), which is the vendor-specific capability identifier 1202. The second byte in this example is a pointer 1204 to a next capability. The third byte is a length 1206 of the capability. The fourth byte in this example, a type 1208 field, is set to zero, and is not used.

The next two bytes in this example include a command 1210, which may be a write-only register. The command 1210 can be used by the virtual machine to issue hot-plug commands. Following the command register of this example is a two-byte read-only status 1212. The status 1212 can be used to return the value of a previous command. A zero or positive value in the status 1212 can indicate that the previous command completed successfully. A negative value may indicate an error or that the command failed.

Each emulated bridge module can create an eventfd file. An eventfd file is a file descriptor, or a handle, that can be used to access an I/O resource. In the examples described above, the eventfd file for the emulated bridge module can be registered to the hot-plug driver in the host operating system, for example through an ioctl cal. When the hot-plug driver detects a new device (e.g., a system module or fabric elements) on a switch fabric module, the hot-plug driver can create a device node for the new device in the host operating system kernel. The hot-plug driver can also queue an event indicating that a new device has been added. The hot-plug driver can also notify the emulated bridge module of the new device through the eventfd file.

In various implementations, the hot-plug driver can generate at least two types of events, including an event indicating the addition of a new device or the removal of an existing device. These events can be queued in the hot-plug driver, and can be read by the emulated bridge module using an eventfd callback. The emulated bridge module can read the event information, and can either plug the new device into the virtual machine, or unplug the removed device from the virtual machine. The virtual machine operating system kernel can detect the change, and can call the registered driver to take an appropriate action.

Table 2 illustrates examples of hot-plug events.

TABLE 2

| Events | Descriptions |
| --- | --- |
| SLOT_HP_ADD_DEVICE | When QEMU reads this event from host hotplug driver, it plugs the specified host device to VM. The corresponding device driver probe function will be called by Linux kernel in VM. |
| SLOT_HP_DELETE_DEVICE | When QEMU reads this event from host hotplug driver, it unplugs the host device from VM. The corresponding device driver remove function will be called by Linux kernel in VM. |

In various implementations, a management module can manage the bus assignments, such as PCI bus numbers, and I/O address space assignments such that sufficient bus numbers and address spaces are reserved for any modules or cards that may be hot-plugged into a network device. In a bus complex, bridges and devices can be connected in a tree-like structure. Each bridge can use a particular range of bus numbers and address spaces for downstream devices.

Generally, the host operating system running on a management module may be platform-independent, as well as being independent of any specific device drivers. This may mean that the host operating system kernel may not know which devices are connected downstream of a bridge, or how much space the device (which may not be present when the operating system boots) may need. In contrast, boot code can be specific to a platform. The boot code may be aware of the hardware configuration of the platform, and may be able to configure and allocate resources for a hot-plug port.

In some implementations, bus resource assignments can be static, and bus numbers and address spaces can be hard-coded into the hot-plug driver. The I/O address space assignment may depend on the configuration of the platform, meaning that the assignment for one platform may not apply to a different platform.

In some implementations, bus resources can be reserved in boot code. In these implementations, the hot-plug driver does not assign bus numbers or address spaces to any of the bridges or fabric elements. Instead, the resources can be automatically assigned by the host operating system, using the boot code reservation.

In various implementations, the management module's virtual machine may not be used to assign any bus resources. Instead, the amount of memory allocated to a virtual bridge can be specified in the BIOS. The BIOS can then assign base addresses for the bridges based on memory availability. The host operating system can then allocate I/O address space to devices downstream from the bridge using the base address of the bridge.

From the virtual machine's perspective, no bridges are hot-plugged, because the virtual bridge can be initiated when the virtual machine boots. Thus, in various implementations, the virtual machine need not reserve any bus numbers for bridges. While at the virtual machine level bus numbers may be assigned at boot time, device I/O address spaces can be assigned when a device is hot-plugged into the virtual machine. Because bus numbers and I/O address spaces can be assigned during runtime, applications in the virtual machine would not hardcode these values, and should instead use the kernel API or hot-plug API to find this information.

In various implementations, when a new fabric element is attached to the virtual machine, applications in the virtual machine may need to know whether the fabric element is in a first slot or a second slot of the switch fabric module. As discussed above, a virtual fabric element can be connected to a virtual bridge in the virtual machine. The virtual fabric element can have a bus number, which can be matched, at the host operating system level, to a downstream bus number (e.g., downstream of the bridge/switch on the management module). The attached bridge (e.g., the bridge on the switch fabric module) can then be read to determine a bridge identifier, which can provide the slot number.

The bus number for a virtual fabric element can be assigned in the virtual machine by the host system. In various implementations, the mapping of slot numbers to bus numbers can be changed from one version of the BIOS to another, or between instances of the emulator process, or between different configurations of the system. In various implementations, each bridge, however, can have a bridge identifier, which can be used to identify the bridge. In these implementations, the mapping of slot numbers to bridge identifiers can be configured, for example by the host operating system or a network administrator. Applicants can then read a bridge slot identification from a capability register to find the bridge identifier.

Figure 13:
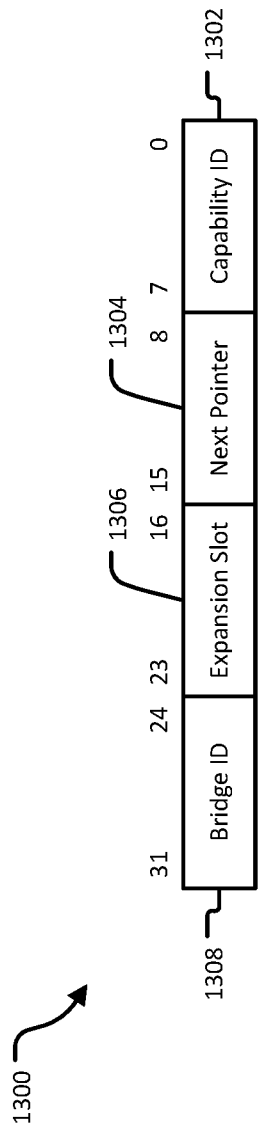
FIG. 13 illustrates an example of a capability register for slot identification.

FIG. 13 illustrates an example of a capability register 1300 for slot identification. In this example, the first byte of the register can include a capability identifier 1302. For example, in some implementations, the capability identifier can be 4. In this example, the second byte can be a pointer 1304 to a next capability. The third byte can contain the slot expansion 1306 information. The fourth byte can contain the bridge identifier 1308. In some implementations, the bridge identifier can be set to 1 for the first slot in the switch fabric module, and 2 for the second slot. By reading this capability register, the slot that a virtual bridge belongs to can be identified. By reading the downstream bus number for the virtual bridge, the bus number that a switch fabric module is assigned to can be identified.

In various implementations, the hot-plug driver can provide a low-level ioctl interface, which can serve as an interface for the emulator process to access the bridge/switch and the host operating system kernel. In some implementations, the hot-plug driver can combine multiple low-level ioctl calls, and provide abstract functions to the virtual machine. In these implementations, these abstract functions can be used by reading or writing vendor-specific capability registers in the virtual bridges.

In various implementations, the emulated bridge module can further provide various commands that the virtual machine can use, through the virtual bridge. For example, the emulated bridge module can include a command to add a device and a command to delete a device. In some cases, there may be a delay after a command is issued and before the next command can be executed.

Table 3 provides examples of API functions for the hot-plug driver. Table 4 provides examples of commands that may be available to the virtual machine kernel and applications in the virtual machine.

TABLE 3

| API Functions | Descriptions |
| --- | --- |
| int slot_init( ); | This function must be called before calling other APIs. It searches all of virtual bridges in VM and sets up slot structures. It returns 0 when initialization is done successfully. |
| void slot_cleanup( ); | This function should be called as the last function when the API is no longer needed. It frees the memory and device nodes, if any. |
| PCISlot *get_slot( int slotid ); | This function returns a slot structure. The slot id is 0-based SFM slot number. The structure has slot information that can be used to issue hotplug commands to the slot. |
| int slot_hp( PCISlot *s, unsigned int command ); | This function is used to issue a hotplug command. The slot structure is returned from get_slot( ), and the command can be found in Table 4. |
| int get_bridge_id_from_bus_nr( int busnr ); | This function finds the bridge using the bus number and returns bridge id if a bridge is found. The bus is the secondary bus of the bridge and the bridge id is the SFM slot number +1. The function returns 0 if no bridge is found. |
| int get_bus_nr( int slotid ); | This function returns the bus number that is used on the bridge secondary bus. All devices connected to the bridge have this bus number. Currently the first SFM bridge has bus number 1, the second bridge has 2, and so on. As the bus number is assigned by system, this number can be changed in the future. Software should use this function to find the bus number. |

TABLE 4

| Commands | Descriptions |
| --- | --- |
| SLOT_HP_GET_PORT_STATUS | Reads status of a hotplug port. Return values: 1 - the port is enabled. 0 - the port is disabled. |
| SLOT_HP_ENABLE_PORT | Enables a hotplug port. |
| SLOT_HP_DISABLE_PORT | Disables a hotplug port. |
| SLOT_HP_GET_SLOT_PRESENCE | Reads the slot presence status. Return values: 1 - the slot is present. 0 - the slot is absent. For a slot the possible reasons for absence are: (a) slot is not plugged in. In this case software can read MM sys FPGA to find the slot is physically absent. (b) Hotplug port is disabled. (c) The PEX bridge on slot is hanging. In this case software can read MM sys FPGA to find the slot is physically present. Software must reset the PEX through i2c bus to recover the device. |
| SLOT_HP_ADD_MODULE | Scans hotplug port and adds devices in system. This will create a node for any device that is found on the slot and hot plug it to VM if the device is an end-device. |
| SLOT_HP_DELETE_MODULE | Deletes devices in host on a slot. |
| SLOT_HP_GET_TP_MODE | Reads SFM PEX transparent mode. Return values: 1 - TP mode. 0 - NTP mode. |
| SLOT_HP_SWITCH_NTP | Changes SFM PEX upstream port mode from non-transparent mode to transparent mode. |
| SLOT_HP_RESET_PORT | Resets hotplug port secondary bus. The reset command is propagated to SFM PEX upstream port and all downstream ports. |
| SLOT_HP_RESET_MODULE | Resets a SFM module. This command deletes all devices on the SFM and disables the hotplug port. When an MM switches from active to standby, this should be called to unplug the devices on the SFM. |

Below is provided example code that illustrates an application of the hot-plug API. The example code illustrates addition or deletion of a switch fabric module. The example functions first determine a slot structure for a switch fabric module. Using this structure, a slot addition step can enable the hot-plug port, should the port be disabled. The functions next can set a bridge port to transparent mode if the port is in non-transparent mode. After this step, the functions can reset the downstream bus that is connected to the switch fabric module. Should no errors occur, the functions can scan the hot-plug port and add any devices found on the switch fabric module to the host operating system kernel. Slot deletion can be accomplished by deleting the devices and disabling the hot-plug port.

```
int slot_add(int slot)
{
  int r = 0;
  PCISlot *s = get_slot(slot);
  if (!s) {
      pr_err("slot: Hotplug driver not installed or bad slot number\n");
      return -EINVAL;
  }
  /* Check port control */
  r = slot_hp(s, SLOT_HP_GET_PORT_STATUS);
  if (r < 0) {
      pr_err("slot: Get port status failed\n");
      goto out;
  }
  if (r > 0)
      goto check_port_status;
  r = slot_hp(s, SLOT_HP_ENABLE_PORT);
  if (r < 0) {
      pr_err("slot: Enable port failed\n");
      goto out;
  }
  msleep(50);
check_port_status:
  if (!slot_hp(s, SLOT_HP_GET_SLOT_PRESENCE)) {
      pr_err("slot: Slot is not detected. Plug in the slot or reset SFM PEX\n");
      return -1;
  }
  /* Check port type */
  r = slot_hp(s, SLOT_HP_GET_TP_MODE);
  if (r < 0) {
      pr_err("slot: Get tp mode failed\n");
      goto out;
  }
  if (r > 0)
      goto add_module;
  r = slot_hp(s, SLOT_HP_SWITCH_NTP);
  if (r < 0) {
      pr_err("slot: Switch to upstream port failed\n");
      goto out;
  }
  r = slot_hp(s, SLOT_HP_GET_TP_MODE);
  if (r < 0) {
      pr_err("slot: Get tp mode failed\n");
      goto out;
  }
  if (!r) {
      pr_err("slot: Not able to switch to upstream port\n");
      goto out;
  }
  /* Do hot reset */
  r = slot_hp(s, SLOT_HP_RESET_PORT);
  if (r < 0) {
      pr_err("slot: Reset port failed\n");
      return -1;
  }
  msleep(100);
add_module:
  /* Add module devices */
  r = slot_hp(s, SLOT_HP_ADD_MODULE);
```

-continued

```
  if (r < 0) {
      pr_err("slot: Add module failed\n");
      goto out;
  }
out:
  return r;
}
int slot_delete(int slot)
{
  int r = 0;
  PCISlot *s = get_slot(slot);
  if (!s) {
      pr_err("slot: Hotplug driver not installed or bad slot number\n");
      return -EINVAL;
  }
  /* Delete module devices */
  r = slot_hp(s, SLOT_HP_DELETE_MODULE);
  if (r < 0) {
      pr_err("slot: Delete module failed\n");
      goto out;
  }
  /* Disable port */
  r = slot_hp(s, SLOT_HP_DISABLE_PORT);
  if (r < 0) {
      pr_err("slot: Disable port failed\n");
      goto out;
  }
out:
  return 0;
}
```

In certain embodiments, a non-transitory machine-readable or computer-readable medium is provided for storing data and code (instructions) that can be executed by one or more processors. Examples of a non-transitory machine-readable or computer-readable medium include memory disk drives, Compact Disks (CDs), optical drives, removable media cartridges, memory devices, and the like. A non-transitory machine-readable or computer-readable medium may store the basic programming (e.g., instructions, code, program) and data constructs, which when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A network device, comprising:
one or more processors; and
a memory coupled with and readable by the one or more processors, wherein the memory includes instructions that, when executed by the one or more processors, cause the one or more processors to execute a host operating system and a virtual machine, and wherein the memory further includes instructions that, when executed by the one or more processors, cause the one or more processors to perform operations including:
establishing an active management module and a standby management module;
detecting, by the active management module, that a component is present in the network device, wherein the component is a physical component, wherein the component is determined to be unknown, and wherein the component is detected during operation of the network device;
determining information about the component;
adding the component to the host operating system, wherein adding the component includes providing the information about the component to the host operating system, wherein the component is a switch fabric module, and wherein the switch fabric module facilitates communication between the active management module, the standby management module and at least one line card of the network device;
adding the component to the virtual machine, wherein adding the component includes providing the information about the component to the virtual machine, wherein, when the component is added to the virtual machine, the component is accessible to one or more processes executing in the virtual machine; and
detecting, by the standby management module, the switch fabric module, wherein the standby management module, in a failover event, adds the switch fabric module to a listing of hardware of the network device.

2. The network device of claim 1, wherein the virtual machine is configured to notify the host operating system to add the component.

3. The network device of claim 1, wherein the host operating system is configured to initiate adding of the component to the virtual machine, wherein the host operating system communicates with a hypervisor executing on the network device, wherein the hypervisor adds to the component to the virtual machine.

4. The network device of claim 1, wherein the memory further includes instructions that, when executed by the one or more processors, cause the one or more processors to execute an emulated bridge module, wherein the emulated bridge module corresponds to a virtual bridge in the virtual machine, and wherein adding the component to the virtual machine includes connecting the component to the virtual bridge.

5. The network device of claim 4, further comprising:
a physical bridge, wherein the physical bridge connects the network device to the component, and wherein the emulated bridge module emulates the physical bridge.

6. The network device of claim 4, wherein the emulated bridge module emulates a physical bridge associated with the component.

7. The network device of claim 4, wherein the memory further includes instructions that, when executed by the one or more processors, cause the one or more processors to execute an emulator process, wherein the emulated bridge module is executed by the emulator process.

8. The network device of claim 1, wherein the memory further includes instructions that, when executed by the one or more processors, cause the one or more processors to execute a hot-plug driver, wherein the hot-plug driver executes in the host operating system.

9. The network device of claim 1, further comprising:
a system module, wherein the system module is a physical device that is configured to detect the component, and wherein, when the system module detects the component, the system module notifies the virtual machine.

10. The network device of claim 1, wherein detecting the component includes determining that the component was added to the network device.

11. The network device of claim 1, wherein detecting the component includes scanning the network device for unknown components.

12. The network device of claim 1, wherein the memory further includes instructions that, when executed by the one or more processors, cause the one or more processors to perform operations including:
detecting that the component has been removed from the network device, wherein the component is detected as removed during operation of the network device;
removing the component from the host operating system; and
removing the component from the virtual machine.

13. The network device of claim 12, wherein removing the component from the virtual machine includes disconnecting the component from an emulated bridge module, wherein the emulated bridge module correspond to a virtual bridge in the virtual machine.

14. The network device of claim 1, wherein adding the component to the host operating system includes using a hot-plug function of the host operating system.

15. The network device of claim 1, wherein adding the component to the virtual machine includes using a hot-plug function in the virtual machine.

16. The network device of claim 1, wherein information about the component includes a slot identifier, wherein the slot identifier identifies a physical slot associated with the component.

17. A method, comprising:
detecting, by an active management module in a network device, that a component is present in the network device, wherein the component is a physical component, wherein the component is determined to be unknown, wherein the component is detected during operation of the network device, and wherein a host operating system and a virtual machine are executing on the network device;
determining information about the component;
adding the component to the host operating system, wherein adding the component includes providing the information about the component to the host operating system, wherein the component is a switch fabric module, and wherein the switch fabric module facilitates communication between the active management module, a standby management module and at least one line card of the network device;
adding the component to the virtual machine, wherein adding the component includes providing the information about the component to the virtual machine, wherein, when the component is added to the virtual machine, the component is accessible to one or more processes executing in the virtual machine, and
detecting, by the standby management module, the switch fabric module, wherein the standby management module, in a failover event, adds the switch fabric module to a listing of hardware of the network device.

18. The method of claim 17, wherein the virtual machine is configured to notify the host operating system to add the component.

19. The method of claim 17, wherein the host operating system is configured to initiate adding of the component to the virtual machine, wherein the host operating system communicates with a hypervisor executing on the network device, wherein the hypervisor adds to the component to the virtual machine.

20. The method of claim 17, wherein detecting the component includes determining that the component was added to the network device.

21. The method of claim 17, wherein detecting the component includes scanning the network device for unknown components.

22. The method of claim 17, further comprising:
detecting that the component has been removed from the network device, wherein the component is detected as removed during operation of the network device;
removing the component from the host operating system; and
removing the component from the virtual machine.

23. A non-transitory computer-readable medium including instructions that, when executed by one or more processors, cause the one or more processors to perform operations including:
detecting, by an active management module in a network device, that a component is present in the network device, wherein the component is a physical component, wherein the component is determined to be unknown, wherein the component is detected during operation of the network device, and wherein a host operating system and a virtual machine are executing on the network device;
determining information about the component;
adding the component to the host operating system, wherein adding the component includes providing the information about the component to the host operating system, wherein the component is a switch fabric module, and wherein the switch fabric module facilitates communication between the active management module, a standby management module and at least one line card of the network device;
adding the component to the virtual machine, wherein adding the component includes providing the information about the component to the virtual machine, wherein, when the component is added to the virtual machine, the component is accessible to one or more processes executing in the virtual machine; and
detecting, by the standby management module, the switch fabric module, wherein the standby management module, in a failover event, adds the switch fabric module to a listing of hardware of the network device.

24. The non-transitory computer-readable medium of claim 23, wherein the virtual machine is configured to notify the host operating system to add the component.

25. The non-transitory computer-readable medium of claim 23, wherein the host operating system is configured to initiate adding of the component to the virtual machine, wherein the host operating system communicates with a hypervisor executing on the network device, wherein the hypervisor adds to the component to the virtual machine.

26. The non-transitory computer-readable medium of claim 23, wherein detecting the component includes determining that the component was added to the network device.

27. The non-transitory computer-readable medium of claim 23, wherein detecting the component includes scanning the network device for unknown components.

28. The non-transitory computer-readable medium of claim 23, further comprising:

detecting that the component has been removed from the network device, wherein the component is detected as removed during operation of the network device;
removing the component from the host operating system; and
removing the component from the virtual machine.

* * * * *